United States Patent
Sampson et al.

(10) Patent No.: US 12,041,297 B2
(45) Date of Patent: Jul. 16, 2024

(54) MEDIA DISTRIBUTION AND MANAGEMENT SYSTEM AND APPARATUS

(71) Applicant: GT SYSTEMS PTY LTD., Surry Hills (AU)

(72) Inventors: Keith Rhett Sampson, Surry Hills (AU); Jaime Llorca, Jersey City, NJ (US); Colin Hendry, Dulwich Hill (AU); Jonathan Holt, Nashville, TN (US); Kevin John Staunton-Lambert, Sydney (AU)

(73) Assignee: GT SYSTEMS PTY LTD., Surry Hills (AU)

( * ) Notice: Subject to any disclaimer, the term of this patent is extended or adjusted under 35 U.S.C. 154(b) by 68 days.

(21) Appl. No.: 17/603,673

(22) PCT Filed: May 7, 2021

(86) PCT No.: PCT/AU2021/050426
§ 371 (c)(1),
(2) Date: Oct. 14, 2021

(87) PCT Pub. No.: WO2021/226656
PCT Pub. Date: Nov. 18, 2021

(65) Prior Publication Data
US 2022/0394327 A1   Dec. 8, 2022

Related U.S. Application Data

(63) Continuation-in-part of application No. 16/865,464, filed on May 4, 2020, now Pat. No. 11,153,639, (Continued)

(30) Foreign Application Priority Data

Nov. 4, 2014 (AU) ................................ 2014904438
May 9, 2020 (AU) ................................. 202091494

(51) Int. Cl.
*H04N 21/436* (2011.01)
*G06Q 10/06* (2023.01)
(Continued)

(52) U.S. Cl.
CPC ......... *H04N 21/4367* (2013.01); *G06Q 10/06* (2013.01); *G06Q 50/10* (2013.01);
(Continued)

(58) Field of Classification Search
CPC ........... H04N 21/4367; H04N 21/2383; H04N 21/4227; H04N 21/4627; H04N 21/482;
(Continued)

(56) References Cited

U.S. PATENT DOCUMENTS 11,606,265 B2 * 3/2023 Dechene ................. H04L 45/64
2021/0152529 A1 * 5/2021 Ruppin ............... H04L 63/0428
(Continued)

*Primary Examiner* — Dominic D Saltarelli
(74) *Attorney, Agent, or Firm* — Rivka Friedman

(57) ABSTRACT

A Unified Content Delivery Network system (UCDN) system which is formed from a network of one or more inter-operable Peer networks.

A hierarchical hybrid adaptive Secure Peer-Assisted Networking System (termed SPAN-AI), using a hierarchical AI driven approach under a unified secure content-addressable architecture which is based on five key SPAN-AI sub systems: unified naming; unified discovery; hybrid adaptive routing; scalable pubsub; and embedded security; all of said five key SPAN-AI sub systems securely integrated and jointly optimized via a hierarchical, pluggable AI framework, with an associated simulation, training, and development pipeline that embeds AI agents with varying degrees of awareness and optimization capabilities at peer, edge, or core or other network levels (hierarchies).

8 Claims, 28 Drawing Sheets

Related U.S. Application Data which is a continuation of application No. 15/523,960, filed as application No. PCT/AU2015/000661 on Nov. 4, 2015, now Pat. No. 10,652,612.

(51) Int. Cl.
| | |
|---|---|
| *G06Q 50/10* | (2012.01) |
| *H04L 9/40* | (2022.01) |
| *H04L 67/06* | (2022.01) |
| *H04N 21/238* | (2011.01) |
| *H04N 21/2383* | (2011.01) |
| *H04N 21/422* | (2011.01) |
| *H04N 21/4227* | (2011.01) |
| *H04N 21/4367* | (2011.01) |
| *H04N 21/462* | (2011.01) |
| *H04N 21/4627* | (2011.01) |
| *H04N 21/482* | (2011.01) |
| *H04N 21/63* | (2011.01) |
| *G06Q 20/12* | (2012.01) |

(52) U.S. Cl.
CPC .............. *H04L 63/20* (2013.01); *H04L 67/06* (2013.01); *H04N 21/2383* (2013.01); *H04N 21/4227* (2013.01); *H04N 21/4627* (2013.01); *H04N 21/482* (2013.01); *H04N 21/632* (2013.01); *G06Q 20/123* (2013.01)

(58) Field of Classification Search
CPC .... H04N 21/632; G06Q 10/66; G06Q 20/123; G06Q 50/10; H04L 63/20; H04L 67/06
USPC ......................................................... 725/131
See application file for complete search history.

(56) References Cited

U.S. PATENT DOCUMENTS

| | | | |
|---|---|---|---|
| 2021/0288902 A1* | 9/2021 | Arora | G06Q 50/26 |
| 2022/0200993 A1* | 6/2022 | Smith | H04L 63/20 |

\* cited by examiner

SPAN AI HYBRID ADAPTIVE ROUTING DESIGN (SPAN AI – HARD)

Fig. 5F

MEDIA DISTRIBUTION AND MANAGEMENT SYSTEM AND APPARATUS

TECHNICAL FIELD

The present invention relates to a media distribution and management system and more particularly but not exclusively, to such a system when implemented utilising a network termination unit (NTU) or an internet appliance which engages with internet infrastructure to deliver and control digital content including (but not limited to) streamed and downloaded digital content to digital devices including (but not limited to) television display units, video display units and the like.

BACKGROUND

There exist certain forms of content receipt and content viewing devices available to consumers. These include television "set top boxes" made available by media distribution companies. Well known versions in Australia include the Foxtel set top box and the Optus set top box. These devices are limited to receipt and delivery of content usually delivered via a cable arrangement.

Also known are certain forms of "internet appliance" which receive digital content typically over the internet for delivery, usually via streaming, to television display units and the like. The "Apple TV" appliance is an example of such a device in current usage within Australia.

It is also known to stream digital content over the internet to personal computers enlisting the aid of file sharing services such as BitTorrent. Such services and their protocols are highly insecure, not suited to streaming, often take a long time to start playback and are not conducive to features such as "jump" to a nominated point in the content.

A problem with these current devices and mechanisms for receipt and delivery of digital content is that current internet infrastructure has variable upload and download speeds and it can be difficult, and in some instances impossible particularly for consumers in a household environment, to reliably receive real time or near real time content, especially high definition and ultra-high definition content or large file content On Demand.

Many if not all current Internet video distribution systems use Adaptive Bit Rate (ABR) technology to overcome the problem of video distribution On Demand via the Internet. However, ABR reduces bit rate and definition and degrades the user experience.

Separately, and in some cases in addition, the choice of content available to the consumer is limited by the proprietary nature of the appliance.

Further, current mechanisms for local control of the content and its delivery and display are not intuitive or "user friendly"

The Internet is reaching its limits of scale, particularly the TCP/IP protocols and routing protocols based on them. Video has placed huge loads on the Internet that were unforeseen at the time of its invention.

After decades of centralization into hyper-scale data centres, networks are starting to push back to the "edge". But there are some subtle and show-stopper problems along that way.

The global Covid-19 pandemic brought forward decades of changes in network usage patterns and loads overnight.

Emerging applications such as industrial automation, machine vision, AR, 5G and other future applications will place even more load on global networks and the Internet.

The world's telco's, CDNs and ISPs have scrambled to catch up, but no single network can solve these problems. It requires new approaches that are capable of seamless inter-operation and scaling for the foreseeable future.

It is an object of the present invention to address or at least ameliorate some of the above disadvantages or provide a useful alternative.

Notes

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

SUMMARY OF INVENTION

Accordingly in one broad form of the invention, there is provided a Unified Content Delivery Network system (UCDN) system which is formed from a network of one or more inter-operable Peer networks.

Preferably, the Peer networks are SPAN-AI networks.

Preferably, the system comprising a hierarchical, hybrid adaptive AI driven networking technology (termed Secure Peer-Assisted Networking or SPAN-AI), that uses an AI-driven hybrid adaptive routing approach based on five key SPAN-AI sub systems: unified naming; unified discovery; hybrid adaptive routing; scalable pubsub; and embedded security; all of said five key SPAN-AI sub systems securely integrated and jointly optimized via a hierarchical, pluggable AI framework, with an associated simulation, training, and development pipeline that embeds AI agents with varying degrees of awareness and optimization capabilities at peer, edge, core or other network levels (hierarchies).

Preferably, the system using a Unified Naming and Discovery (UND) System that i) maps mutable human readable names (e.g., domain names, content names) to immutable self-certifying content identifiers (CIDs), and ii) enables routing CIDs through both name-resolution and name based routing subsystems, by iii) prepending a name prefix to each CID.

In another preferred embodiment, the system using a Unified Naming and Discovery (UND) System that i) maps mutable human readable names (e.g., domain names, content names) to immutable self-certifying content identifiers (CIDs), and ii) enables routing CIDs through both name-resolution and name based routing subsystems, by iii) combining a name and a CID in such a way as to optimise routing and/or storage.

Preferably, the UND also combines IP DNS to ensure backwards compatibility.

Preferably, the system further employing an AI-driven universal discovery system which includes a key component, Ambient Intelligent Rendezvous (termed AmI-Rendezvous) which provides smart discovery, configuration, and self-organization services.

Preferably, the SPAN-AI system addressing routing at scale via an AI-driven Hybrid Adaptive Routing Design (termed AI-HARD system); said AI-HARD system composed of two subsystems: a storage-centric routing sub system; and a Delivery-centric routing subsystem; said sub systems combining the benefits of name-resolution-based routing (NRR) for scalable, available, accessible distributed storage, and the advantages of name-based routing (NBR) for fast, reliable content delivery.

Preferably, AI HARD also combines IP routing to provide backward compatibility.

Preferably, AI-HARD intelligent agents within SPAN-AI exploit predictive knowledge about network conditions and application requirements to adaptively choose most efficient routing policies from subsystems.

Preferably, the system includes both SPAN-AI's smart discovery service AmI-Rendezvous and IP name discovery i.e. DNS to provide backward compatibility.

Preferably, AI-HARD protocols, naming standards, conventions and methods are published to enable incorporation in existing as well as new routers thereby to enable interoperation of existing IP networks with new SPAN-AI networks.

Preferably, the protocols, naming standards, conventions and methods include IP naming.

Preferably, the AI-HARD system interoperates with multiple storage and delivery networks.

Preferably, the storage and delivery networks may operate on a crypto token such as Filecoin or Blust.

Preferably, the SPAN-AI system utilising an AI-driven pub-sub system for asynchronous multi-party dissemination services that support: control plane dissemination of directory updates (names, discovery, configuration) and intelligence updates (optimization/control operations); as well as data plane dissemination for collaborative applications, e.g. for social networks, video conferencing, etc.

Preferably, SPAN-AI uses an AI-driven pub-sub system for asynchronous multi-party dissemination services that include communication between AI agents, naming services, discovery services.

Preferably, the AI-driven pub-sub system includes interoperation with IP discovery services.

Preferably, the pub/sub system uses the AmI-Rendezvous service expanded with peer heartbeat and mesh health metrics and rankings for improved operation, intelligent discovery and configuration via a combination of awareness and control for: Peer/Local Intelligence; Edge/Swarm Intelligence; and Core/Global Intelligence.

Preferably, AmI-Rendezvous incorporates a pluggable interface for self-healing agents embedding AmI-Rendezvous clients into the pub/sub protocol e.g. an evolution of existing pubsub algorithms such as Gossipsub, PlumTree, HyParView.

Preferably, the SPAN-AI system incorporates security integrated at all levels.

Preferably, the SPAN-AI system uses machine learning and recognition to detect and manage security threats.

Preferably, Content is encrypted using DRM systems such as PlayReady before it is published to the system.

Preferably, Data packets are cryptographically signed by the publisher.

Preferably, Naming is rooted in self-sovereign identity, which can be defined as a lifetime portable digital identity that does not depend on any centralized authority.

Preferably, the system uses decentralized identifiers that provide: persistence, global resolvability, cryptographic verifiability, and decentralization.

Preferably, Names are self-certifying.

Preferably, the system is based on a hardware root of trust and secure boot.

Preferably, the system makes use of Web of Trust methods.

Preferably, the system makes use of Quantum encryption, i.e. encryption based on quantum state random number generators.

Preferably, the system orchestrating the adaptive operation of the routing and pub/sub systems via a family of pluggable, hierarchical (local/edge/global/other) AI agents that provide monitoring, prediction, optimization, and control services with varying degrees of awareness and optimization capabilities at peer, edge, core and other network levels.

Preferably, the system provides methods for pluggable AI agents to enable open, flexible innovation in the optimization and control of universal networks.

Preferably, the AI agents are exchangeable for crypto tokens such as Filecoin or Blust.

Preferably, the SPAN-AI system uses a simulation, training, and development pipeline that enables cloud-level replication of runtime environments, simulation, testing, and training of AI models and agents, that can then be plugged into peer/edge/core/other network nodes for real-time optimization and control.

Preferably, the system further includes a Self-Aware Mesh Simulator (termed SAMSim system), and wherein said SAMSim system is supported by distributed cloud hosting a big data lake of meshes with health metrics simulating and deploying AI models across an automated software engineering pipeline.

According to another broad form of the invention there is provided a hierarchical hybrid adaptive Secure Peer-Assisted Networking System (termed SPAN-AI), using a hierarchical AI driven approach under a unified secure content-addressable architecture which is based on five key SPAN-AI sub systems: unified naming; unified discovery; hybrid adaptive routing; scalable pubsub; and embedded security; all of said five key SPAN-AI sub systems securely integrated and jointly optimized via a hierarchical, pluggable AI framework, with an associated simulation, training, and development pipeline that embeds AI agents with varying degrees of awareness and optimization capabilities at peer, edge, or core or other network levels (hierarchies).

Preferably, the system uses a Unified Naming and Discovery (UND) System that i) maps mutable human readable names (e.g., domain names, content names) to immutable self-certifying content identifiers (CIDs), and ii) enables routing CIDs through both name-resolution and name based routing subsystems, by iii) prepending a name prefix to each CID.

In another preferred embodiment the system uses a Unified Naming and Discovery (UND) System that i) maps mutable human readable names (e.g., domain names, content names) to immutable self-certifying content identifiers (CIDs), and ii) enables routing CIDs through both name-resolution and name based routing subsystems, by iii) combining a name and CID in such a way as to optimise routing and/or storage.

Preferably, the system further employs an AI-driven unified discovery system which includes a key component, Ambient Intelligent Rendezvous (termed AmI-Rendezvous) which provides smart discovery, configuration, and self-organization services.

Preferably, the SPAN-AI system addressing routing at scale via an AI-driven Hybrid Adaptive Routing Design (termed AI-HARD system); said AI-HARD system composed of two subsystems: a storage-centric routing subsystem; and a Delivery-centric routing subsystem; said sub systems combining the benefits of name-resolution-based routing (NRR) for scalable, available, accessible distributed storage, and the advantages of name-based routing (NBR) for fast, reliable content delivery.

Preferably, AI-HARD intelligent agents within SPAN-AI exploit predictive knowledge about network conditions and application requirements to adaptively choose most efficient routing policies from subsystems.

Preferably, AI-HARD protocols are published to enable incorporation in existing as well as new routers thereby to ensure routing compatibility between all networks.

Preferably, the AI-HARD system interoperates with multiple storage and delivery networks.

Preferably, the storage and delivery networks may operate on a crypto token such as Filecoin or Blust.

Preferably, the SPAN-AI system utilising an AI-driven pub-sub system for asynchronous multi-party dissemination services that support control plane dissemination of: directory updates (names, discovery, configuration) and intelligence updates (optimization/control operations); as well as data plane dissemination for collaborative applications, e.g. for video conferencing, social networks, etc.

Preferably, SPAN-AI uses an AI-driven pub-sub system for asynchronous multi-party dissemination services that include communication between AI agents, naming services, discovery services.

Preferably, the pub/sub system uses the AmI-Rendezvous service expanded with peer heartbeat and mesh health metrics and rankings for improved operation, intelligent discovery and configuration via a combination of awareness and control for: Peer/Local Intelligence; Edge/Swarm Intelligence; Core/Global and other Intelligence.

Preferably, AmI-Rendezvous incorporates a pluggable interface for self-healing agents embedding AmI-Rendezvous clients into the pub/sub protocol e.g. an evolution of existing pubsub algorithms such as Gossipsub, PlumTree, HyParView.

Preferably, the SPAN-AI system incorporating security integrated at all levels.

Preferably, the SPAN-AI system using machine learning and recognition to detect and manage security threats.

Preferably, Content is encrypted using DRM systems such as PlayReady before it is published to the system.

Preferably, Data packets are cryptographically signed by the publisher.

Preferably, Naming is rooted in self-sovereign identity, which can be defined as a lifetime portable digital identity that does not depend on any centralized authority.

Preferably, the system uses decentralized identifiers that provide: persistence, global resolvability, cryptographic verifiability, and decentralization.

Preferably, Names are self-certifying.

Preferably, the system is based on a hardware root of trust and secure boot.

Preferably, the system makes use of Web of Trust methods.

Preferably, the system makes use of Quantum encryption, i.e. encryption based on quantum state random number generators.

Preferably, the SPAN-AI system orchestrating the adaptive operation of the routing and pub/sub systems via a family of pluggable, hierarchical (local/edge/global/other) AI agents that provide monitoring, prediction, optimization, and control services with varying degrees of awareness and optimization capabilities at peer, edge, core and other network levels.

Preferably, the system provides methods for pluggable AI agents to enable open, flexible innovation in the optimization and control of unified networks.

Preferably, the AI agents are exchangeable for a crypto token such as Filecoin or Blust.

Preferably, the SPAN-AI system uses a simulation, training, and development pipeline that enables cloud-level replication of runtime environments, simulation, testing, and training of AI models and agents, that can then be plugged into peer/edge/core/other network nodes for real-time optimization and control.

Preferably, the system further includes a Self-Aware Mesh Simulator (termed SAMSim system), and wherein said SAMSim system is supported by: distributed cloud hosting a big data lake of meshes with health metrics simulating and deploying AI models across an automated software engineering pipeline.

According to another broad form of the invention, there is provided with a hierarchical hybrid adaptive Secure Peer-Assisted Networking System (termed SPAN-AI), using a hierarchical AI driven approach under a unified secure content-addressable architecture; said system comprising routing at scale via an AI-driven Hybrid Adaptive Routing Design (termed AI-HARD system) which is composed of two subsystems: a storage-centric routing subsystem; and a Delivery-centric routing subsystem; which combine the benefits of name-resolution-based routing (NRR) for scalable, available, accessible distributed storage, and name-based routing (NBR) for fast, reliable content delivery.

Preferably, the AI-HARD system interoperates with multiple storage and delivery networks.

Accordingly in another broad form of the invention there is provided a SPAN-AI, for AI-driven Secure Peer-Assisted Networking, is a hybrid adaptive networking technology that provides global, scalable, secure, distributed content storage, computation, and delivery for any application and network environment. SPAN-AI recognizes the limitations of existing technologies, only suitable for specific applications at non-global scale, and uses an AI-driven hybrid routing approach to improve and adaptively combine best-fit features of existing solutions under a unified secure content-addressable architecture. We call this a Unified Content Delivery Network or UCDN. SPAN-AI is based on 5 key systems: unified naming; unified discovery; hybrid routing; scalable pubsub; and embedded security; all securely integrated and jointly optimized via a hierarchical, pluggable AI framework, with an associated simulation, training, and development pipeline that embeds AI agents with varying degrees of awareness and optimization capabilities at peer, edge, core and other network levels.

Preferably, SPAN-AI uses a Unified Naming System that i) maps mutable human readable names (e.g., domain names, content names) to immutable self-certifying content identifiers (CIDs), and ii) enables routing CIDs through both name-resolution and name based routing subsystems by iii) prepending a name prefix to each CID.

In another preferred embodiment, SPAN-AI uses a Unified Naming System that i) maps mutable human readable names (e.g., domain names, content names) to immutable self-certifying content identifiers (CIDs), and ii) enables routing CIDs through both name-resolution and name based routing subsystems by iii) combining a name prefix and CID in such a way as to optimise routing and/or storage.

Preferably, SPAN-AI uses a unified discovery system based on an Ambient Intelligent Rendezvous service, AmI-Rendezvous, designed to provide smart discovery and self-organizing services via a combination of hierarchical AI awareness and control agents: Peer/Local Intelligence; Edge/Swarm Intelligence; Core/Global Intelligence and Intelligence at other levels. AmI-Rendezvous includes peer heartbeat collection, mesh health metrics aggregation, peer rankings, peer discovery, and mesh self-configuration services.

Preferably, SPAN-AI addresses routing at scale via an AI-driven Hybrid Adaptive Routing Design (AI-HARD), composed of 2 subsystems: a storage-centric routing subsystem; and a Delivery-centric routing subsystem; aimed at combining the benefits of name-resolution-based routing (NRR) for scalable, available, accessible distributed storage, and the advantages of name-based routing (NBR) for fast, reliable content delivery. AI-HARD uses hierarchical AI agents to control and optimize the joint operation of NRR and NBR subsystems. AI-Hard can use AmI-Rendezvous for discovery and self-organization in highly dynamic scenarios. AI-HARD includes storage and delivery markets.

Preferably, SPAN-AI uses an AI-driven publish-subscribe (pub-sub) system for asynchronous multi-party dissemination services that support: control plane dissemination of directory updates (names, discovery, configuration) and intelligence updates (optimization/control operations); as well as data plane dissemination for collaborative applications, e.g. for video conferencing, social networks, etc. SPAN-AI pubsub uses AmI-Rendezvous for pubsub mesh discovery and self-organization, including a pluggable interface for self-healing agents into the pub/sub protocol which is an evolution of existing pubsub algorithms such as Gossipsub, PlumTree, HyParView.

Preferably, SPAN-AI incorporates security integrated at all levels. SPAN-AI uses machine learning and recognition to detect and manage security threats. Content can be encrypted using commercial DRM systems such as Play-Ready before it is published to the system. Data packets can be cryptographically signed by the publisher. Naming is rooted in self-sovereign identity, which can be defined as a lifetime portable digital identity that does not depend on any centralized authority. It uses decentralized identifiers that provide: persistence, global resolvability, cryptographic verifiability, and decentralization. Names can also be self-certifying. A preferred embodiment is based on a hardware root of trust and secure boot. A further preferred embodiment may make use of Web of Trust methods. Quantum encryption, i.e. encryption based on quantum state random number generators, may also be used.

Preferably, SPAN-AI orchestrates the adaptive operation of the routing and pub/sub systems via a family of pluggable, hierarchical (local/edge/global) AI agents that provide monitoring, prediction, optimization, and control services with varying degrees of awareness and optimization capabilities at peer, edge, core and other network levels.

Preferably, SPAN-AI provides a marketplace for pluggable AI agents to enable open, flexible innovation in the optimization and control of unified networks. This may be based on a crypto token such as Filecoin or Blust.

Preferably, SPAN-AI uses a simulation, training, and development pipeline that enables cloud-level replication of runtime environments, simulation, testing, and training of AI models and agents, that can then be plugged into peer/edge/core/other network nodes for real-time optimization and control.

Preferably, SPAN-AI includes a simulation pipeline, Self-Aware Mesh Simulator (SAMSim), supported by distributed cloud hosting a big data lake of meshes with health metrics simulating and deploying AI models across an automated software engineering pipeline.

Accordingly, in another broad form of the invention there is provided, a network appliance which receives digital content from a remote location; said appliance including decoding and recoding means by which digital content is downloaded, decoded then recoded for on-transmission to a digital device for consumption by a user.

Preferably the digital content is recoded according to secure HDMI coding algorithms.

Preferably said network appliance received said digital content according to criteria comprising one or more of:
a. most needed packet
b. fastest download speed
c. least latency
d. the network address from where the next digital bit or group of bits can most easily and efficiently be acquired in order to maintain real-time or near real-time delivery of digital content.

In yet a further broad form of the invention there is provided, a Web server which aggregates items of digital content for subsequent on forwarding according to a secure methodology of at least a portion of a copy of an item on request from a network appliance located at a remote location.

Preferably said secure methodology comprises, obtaining and forwarding packets of data forming said digital content according to one or more of the following criteria:
a. most needed packet
b. fastest download speed
c. least latency
d. the network address from where the next digital bit or group of bits can most easily and efficiently be acquired in order to maintain real-time or near real-time delivery of digital content.

In yet a further broad form of the invention there is provided, a method of assembling an item of digital content; said method comprising receiving at least a first portion of the item of digital content from an origin store of digital content located at a remote location.

Preferably the method further includes obtaining and forwarding packets of data forming said item of digital content according to one or more of the following criteria:
a. most needed packet
b. fastest download speed
c. least latency
d. the network address from where the next digital bit or group of bits can most easily and efficiently be acquired in order to maintain real-time or near real-time delivery of digital content.

In yet a further broad form of the invention there is provided, a distributed system for delivery of digital content; said system comprising at least one content aggregator in communication with an origin store; a plurality of network appliances; the aggregator receiving digital content in the form of items of content; the aggregator securing the digital content for distribution by the system; the origin store making available the digital content to said plurality of network appliances; each network appliance receiving specified items of content on request to said system by a said network appliance.

Preferably said system communicates over the Internet.

Preferably each network appliance operates according to secure peer assist criteria; said secure peer assist criteria enabling reception of at least portions of said item of content from others of said plurality of network appliances if said item of content has been previously downloaded to said others of said plurality of network appliances.

In yet a further broad form of the invention there is provided, a system for ingesting, aggregating curating, managing, publishing, searching, selling, distributing and settling the purchase of digital content; said system operating according to the method described above.

Preferably the step of settling includes paying content owners and retailers for specified items of digital content according to complex rights and release window agreements.

In yet a further broad form of the invention there is provided, a method of syndicating the system described above thereby to allow a plurality of Internet retailers to sell digital content transmitted according to the methods described above.

BRIEF DESCRIPTION OF DRAWINGS

It will be understood that the figures below are each representations of a particular aspect of the invention and are not intended to be exhaustive or complete on their own or together. In particular it will be understood that in a system or block diagram any system or sub-system may be connected to or through any other system or sub-system functionally, logically or physically with or without transformation of the connection.

Embodiments of the present invention will now be described with reference to the accompanying drawings wherein.

DESCRIPTION OF EMBODIMENTS

First Preferred Embodiment

Figure 2A:
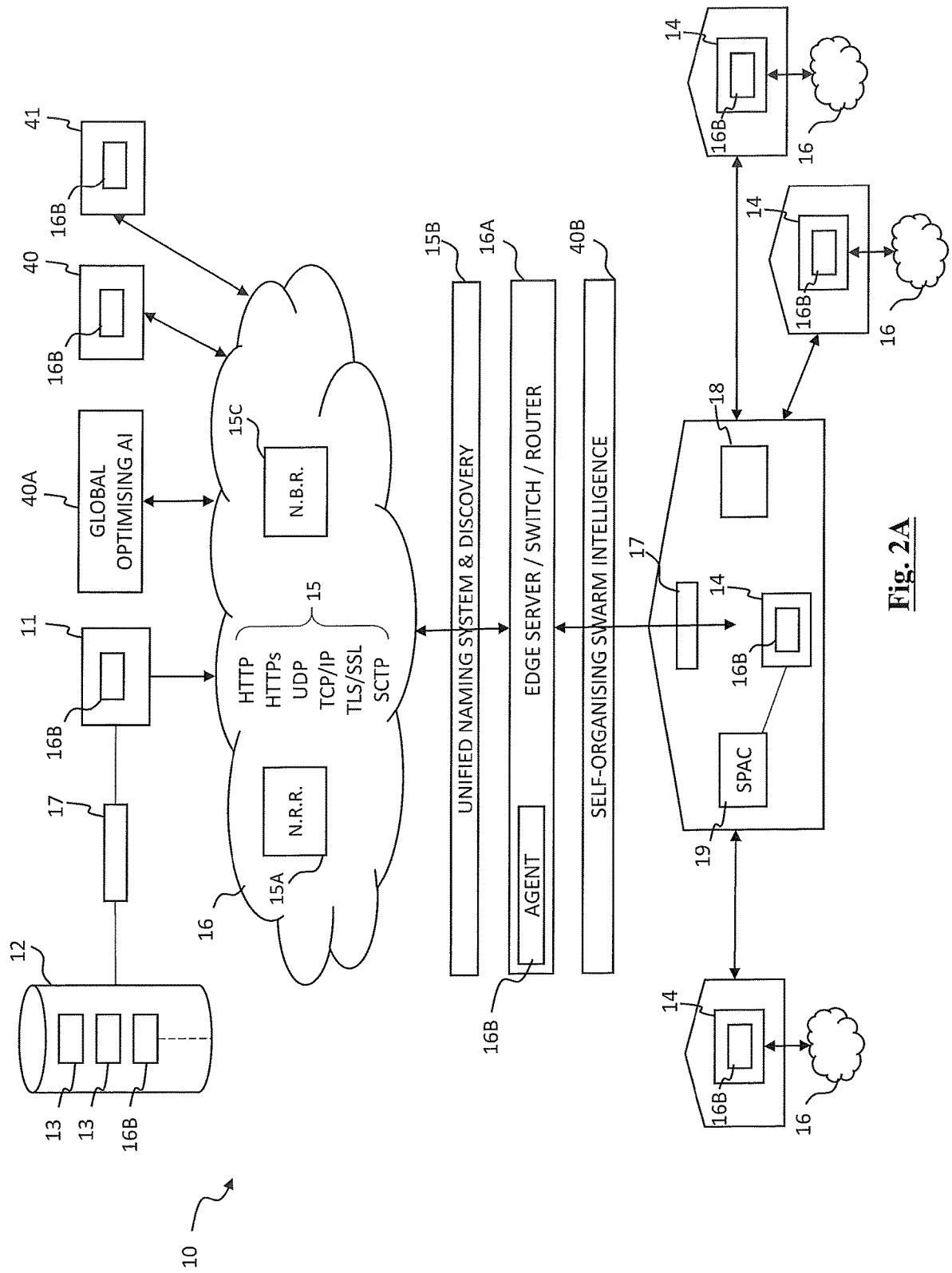
FIG. 2A is a block diagram of a media distribution and management system comprising a first embodiment and the SPAN-AI components of FIG. 1A as a further embodiment (the SPAN-AI embodiment) of the present invention.
Figure 2B:
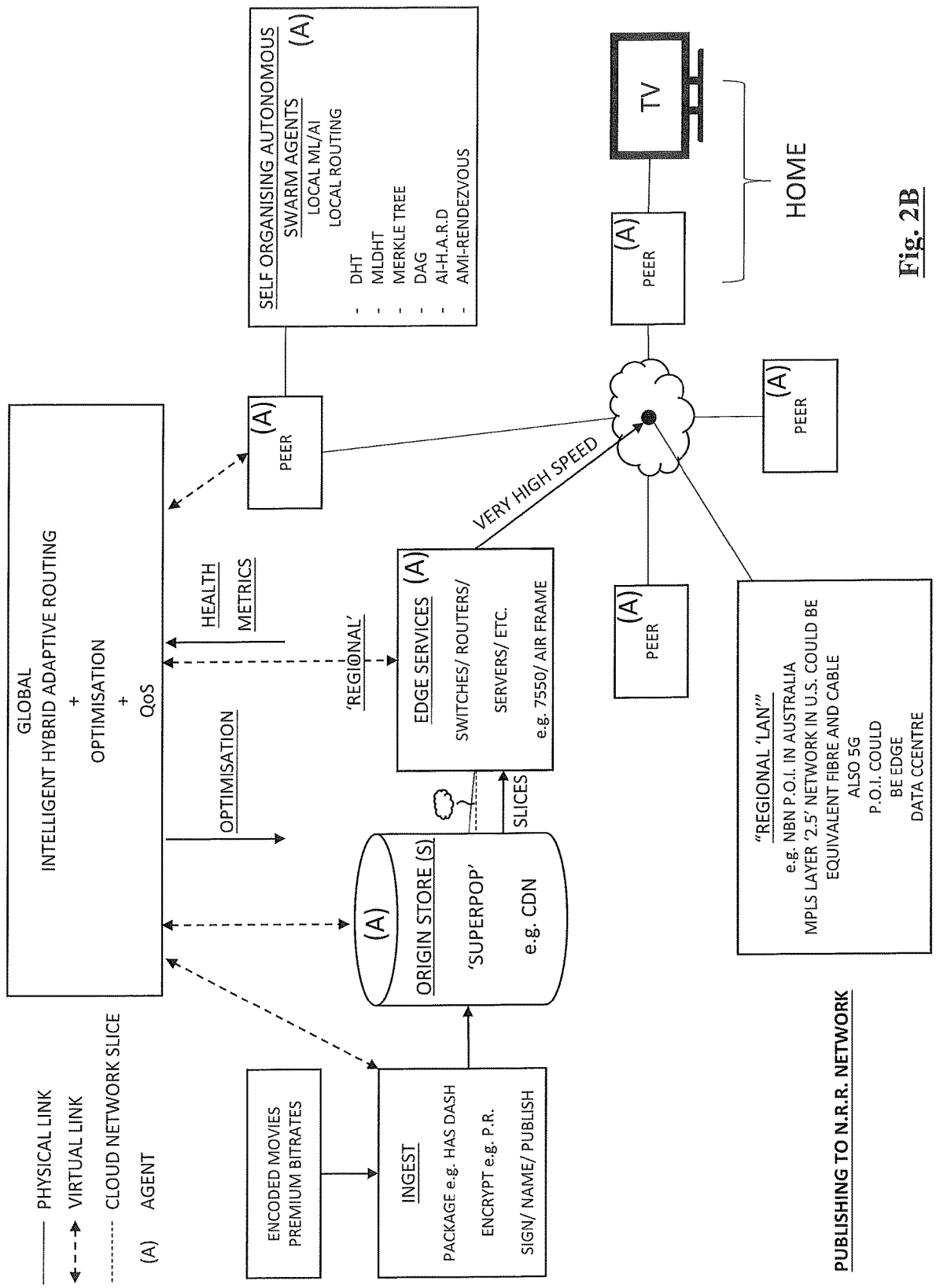
FIG. 2B is a block diagram of information flow through the network of FIG. 2A when publishing to the Name Resolution Routing (NRR) systems.
Figure 2C:
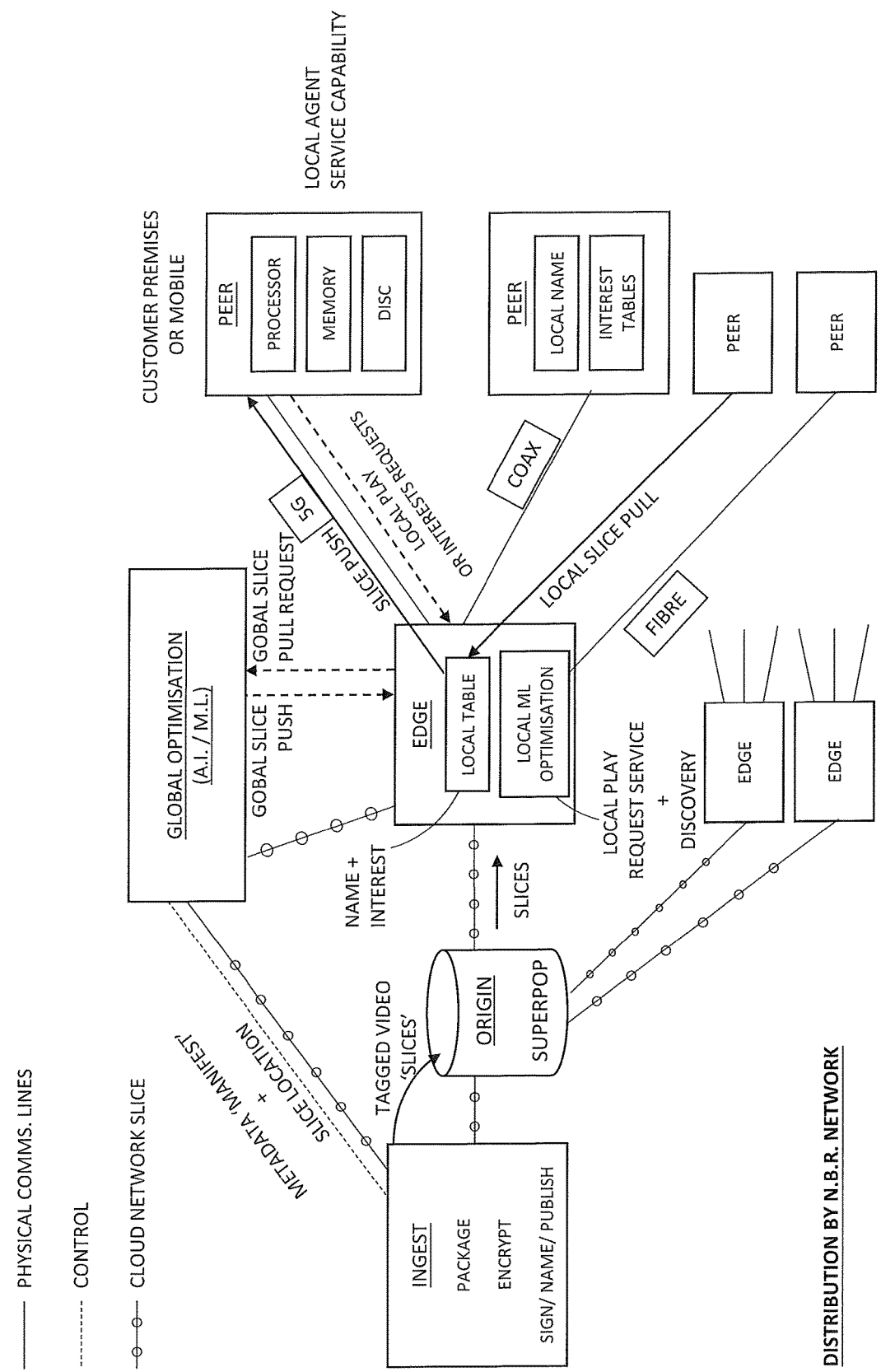
FIG. 2C is a block diagram of information flow through the network of FIG. 2A via the Name Based Routing (NBR) systems.

With reference to FIG. 2A there is illustrated a block diagram of a media distribution and management system 10 in accordance with a first preferred embodiment (and also incorporating SPAN-AI system components which define a further embodiment—the SPAN-AI embodiment—refer SPAN-AI embodiment description further in the specification).

In this instance the system 10 includes an origin store 11 (sometimes termed a "Super PoP" in parts of this specification). The origin store 11 may be implemented as a single server or may itself be a network of servers. In particular commercial implementations, the servers may form part of a commercial partner content distribution network. The origin store 11 is in communication with various databases 12 which contain digital content 13 available for licensed use (usually, but not always, subject to negotiation of appropriate terms). The origin store 11 receives the digital content 13 usually as "wrapped" content meaning that digital rights management (DRM) has been applied to the content.

The origin store 11 makes this content 13 available to subscribers or purchasers by way of a network appliance 14. The network appliance 14 is located at or close to the point of consumption of digital content 13.

In accordance with embodiments of the present invention the network appliance 14 can receive digital content 13 from the origin store 11 directly in accordance with communication protocols 15 commonly available when communicating via the Internet 16. Most commonly it is expected that communication will be via the Internet 16 but other structures can be contemplated which facilitate use of the protocols 15. The digital content 13 may be secured from the point of ingest to the network appliance 14 by use of one or more of the following security technologies and features:

- Secure ingest via Aspera to the Platform's secure environment
- All master asset storage and processing remains within the Platform's approved secure environment
  i. Mezzanine storage in the Platform secure storage
  ii. Transcode on the Platform secure transcode farms
  iii. DRM wrap on the Platform secure Microsoft PlayReady server
  iv. Transfer of DRM wrapped assets to EdgeCast origin store [11] from the Platform
- Another embodiment includes separate secure ingest, mezzanine storage, transcode and DRM wrapping on and in Motion Picture Association of America approved facilities.
- All rights and entitlements managed by the Platform and Microsoft PlayReady
- Distribution via EdgeCast network of Super PoPs and Secure Peer Assist™ to network appliance hardware Trusted Execution Environment (TEE) with secure PlayReady client
- The system is designed for multi-layered security from the ground up
- network appliance secure DRM transcode in TEE to secure HDMI HDCP connection to TV
- network appliance network access is secured by Public Key Infrastructure (PKI) security and certificates.

The communication structures and algorithms programmed into the aggregator database 12 and the network appliances 14 are such that content 13 is initially obtained from the aggregator database 12 typically over the Internet 16 following an initialisation sequence which permits a given network appliance 14 access to and use of a specified item 17 of digital content 13. Again, but not necessarily always, permission will be subject to negotiation of commercial terms in advance of access being provided to the specified item 17.

Once all or part of the specified item 17 has been downloaded to a given network appliance 14 it can be "played" by that appliance. Most usually the appliance will output secure e.g. HDMI HDCP digital content to an audio-visual display device 18 such as a television set. In other embodiments it can be streamed securely wirelessly or via Ethernet to other devices such as tablets and phones and TVs. In other cases it may be game content that is played on the appliance or "side loaded" wirelessly or via Ethernet or some other method to gaming devices such as other gaming platforms.

A feature of the present system 10 is that if another network appliance 14 negotiates and requests access to the same specified item 17 the content may be downloaded (or portions of it) from either the origin store 11 or the network appliance 14 which already has that specified item 17 stored on it.

As to which source to use that will be determined according to network knowledge and secure peer assist criteria 19 which include:

a. most needed packet
b. fastest download speed
c. least latency
d. the network address from where the next digital bit or group of bits can most easily and efficiently be acquired in order to maintain real-time or near real-time delivery of digital content.

Routing information may be distributed and/or centralised and may be in the form of hash tables or other efficient database mechanisms. This detailed knowledge combined with control of network appliances 14 and routing is a form of software defined networking (SDN).

Figure 3:
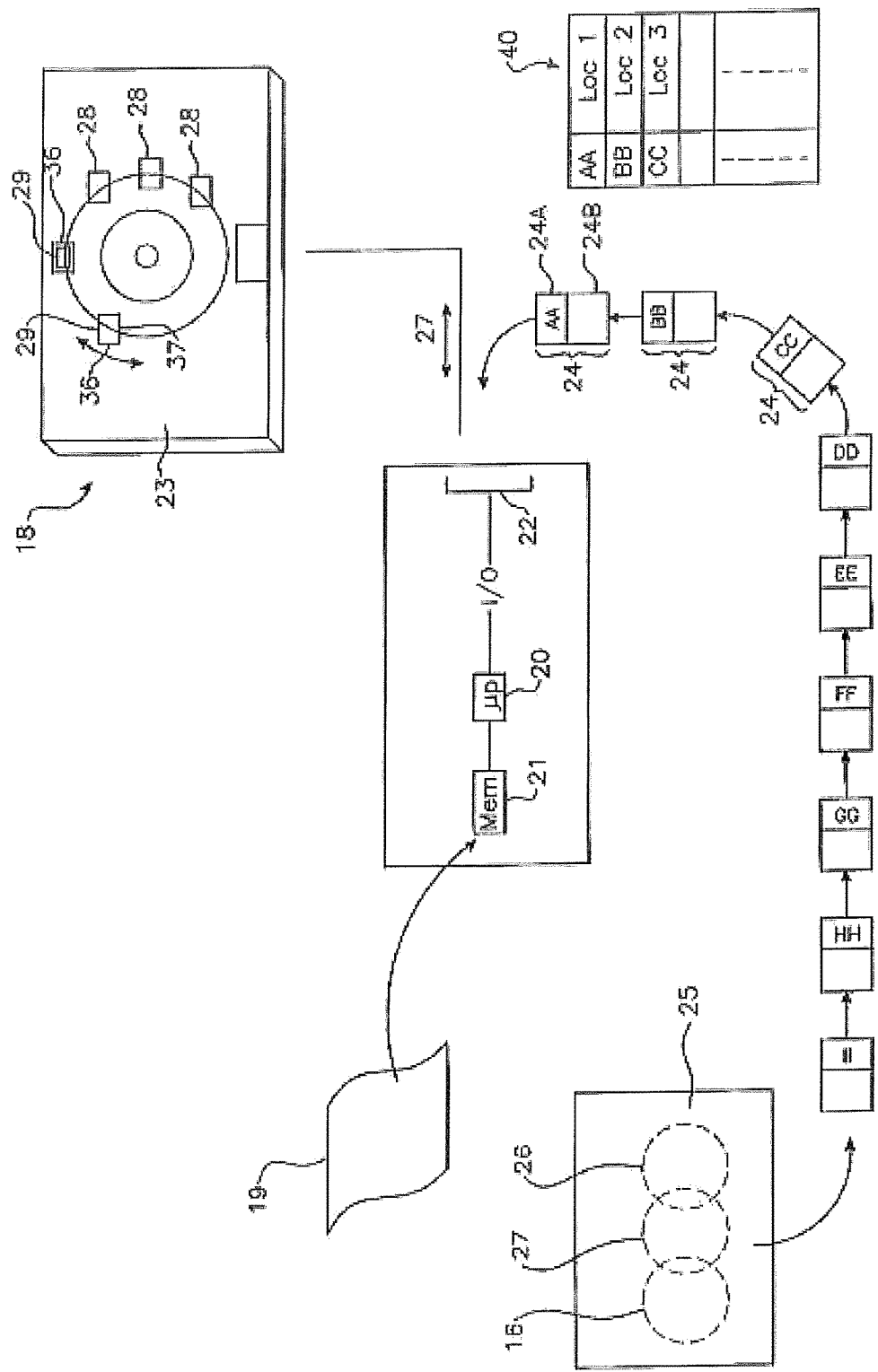
FIG. 3 is a block diagram of a network appliance usable in conjunction with the system of FIG. 2A and the associated routing methods
Figure 3A:
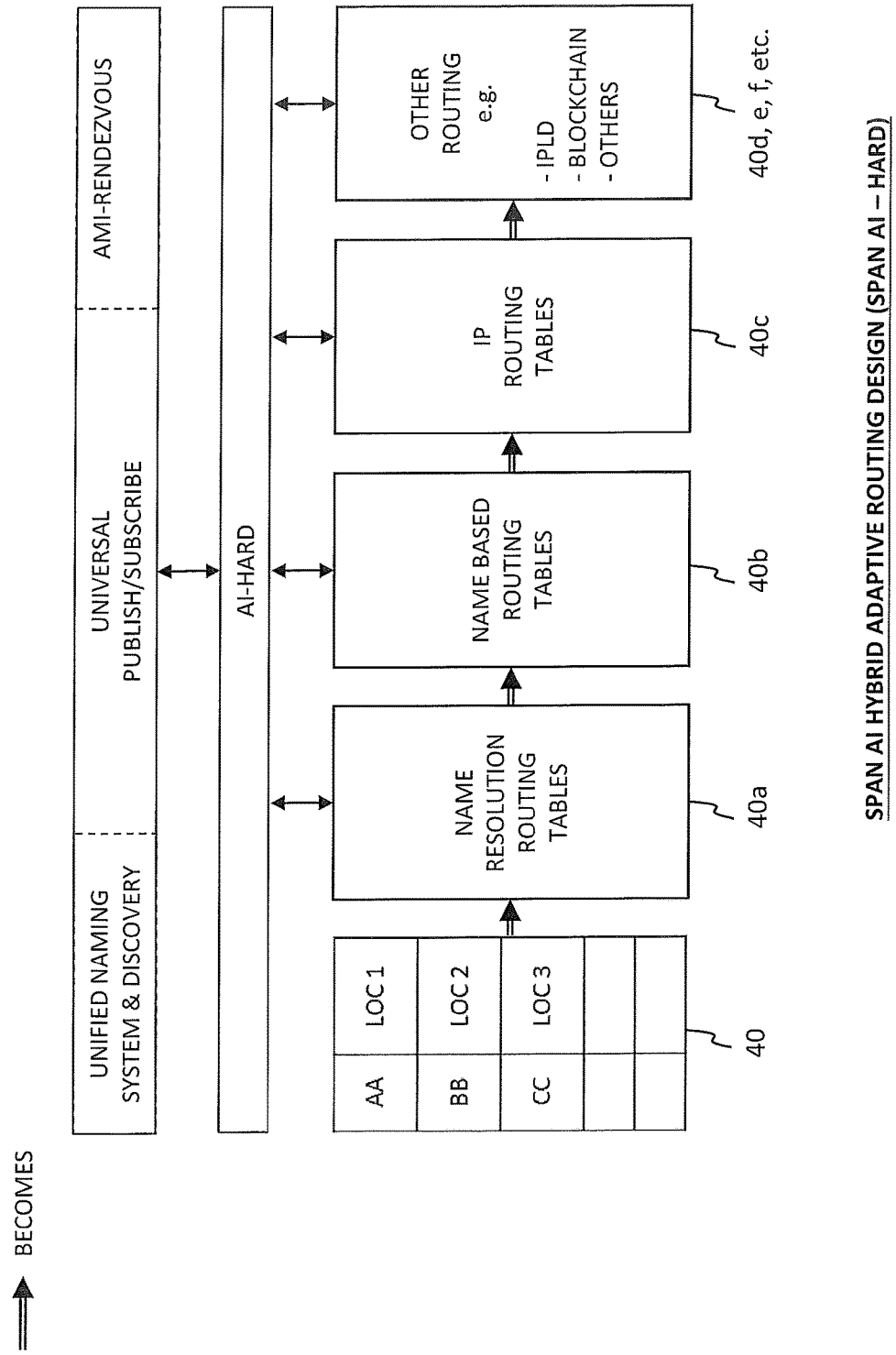
FIG. 3A is a block diagram of routing tables used in the SPAN-AI and AI HARD arrangement of FIG. 1A
Figure 4:
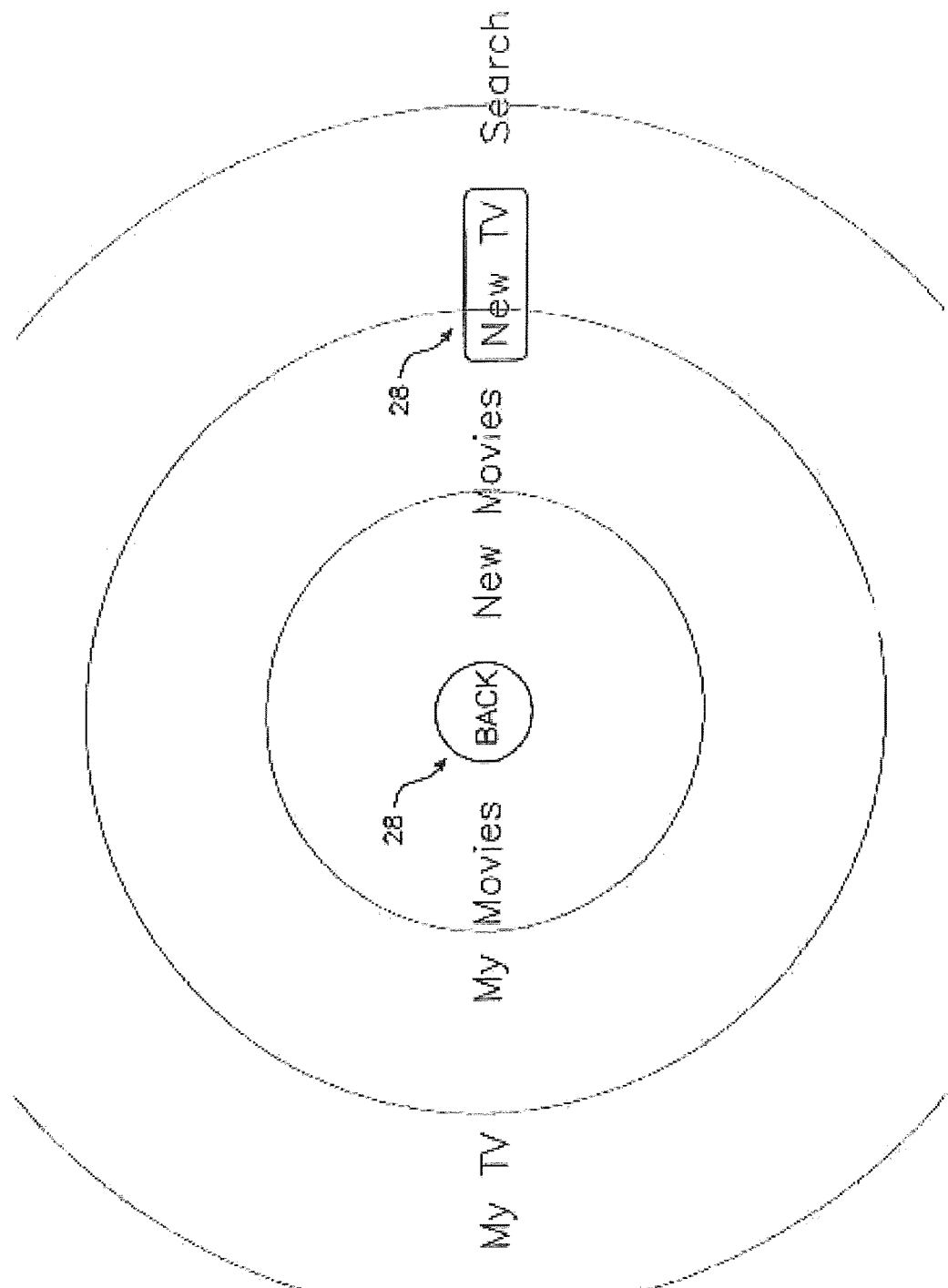
FIG. 4 is a video output view showing graphical structures that are utilised interactively with the modes of operational control of the appliance of FIG. 3.

Specifically "network knowledge" includes address information for all data packets that will form digital content 13 and, more particularly, at any one time address information for all data packets that form part of a specified item 17. This data packet address information may be stored in a database 40 as shown in FIG. 3 wherein each individual address, for example address AA of respective data packet 24 is linked to a location, location loc1 in this instance.

The database 40 may be stored on or form part of the origin store 11 or it may be a separate server. In other instances it may be stored, at least partially, in memory 21 of the individual network appliances 14 in order to provide a distributed storage arrangement. It will be understood that over time there will become available a significant number of sources distributed over a wide area from which a specified item 17 may be downloaded (in whole or in part).

As to which source to use may be determined in conjunction with telcos and ISPs in order to optimise use of their networks and minimise costs to consumers, the telcos and ISPs and the service operator. This may take the form of "unmetered content" agreements for Secure Peer assist traffic that remains within a network operator's domain.

Commercially different models can be used as to upon what basis the specified item is permitted to be downloaded or streamed to a specific network appliance 14. For example the model may be based upon "pay as you go" such as pay-per-view or rent or download to own.

In the alternative it can be based upon a subscription model.

One example of the network appliance 14 will be described in more detail below however it should be understood that a processor programmed to provide the above described functionality can be located within a smart phone or a smart TV or a games controller-it does not need to be limited to a specific standalone dedicated network appliance 14.

The combination of Super PoP CDN and Secure peer assist criteria ensures optimum delivery. Video packets are sourced from the best available location. The network of network appliance nodes provides the optimum network architecture: intelligence and storage at the furthest edge the network, i.e. the customer premises. This is reinforced by a master Super PoP to fill any gaps. This architecture ensures that we drive the user's connection at maximum bandwidth whilst minimising hierarchical network traffic and inter-network peering. Network protocols and parameters have been optimised based on experience.

The Secure peer assist criteria and applications programs based on them are aware of and report network traffic at the SCTP, TCP/IP, UDP and video packet level. Each network appliance 14 forms an intelligent node in a mesh network. This may be sometimes described as grid computing or distributed cloud computing. We combine distributed and centralised routing information and intelligence down to the video packet level. This enables optimum management of the network with Software Defined Network like capability.

Secure peer assist criteria permits formation of an entire ecosystem for video and game delivery management via the Internet. Each network appliance 14 monitors metrics and statistics at the network and video packet level, reporting traffic and video state in real time. Combined with video asset management and distribution platform and Super PoP CDN, there is provided comprehensive quality of service (QoS) monitoring and control for the entire network. Secure peer assist criteria provides a very efficient method of video distribution via the Internet, minimizing network load and maximising network and customer viewing performance. Secure peer assist criteria may also be implemented in Consumer Electronics (CE) apps.

Secure peer assist criteria 19 extends network reach beyond the edge, right to customers' homes. Secure peer assist criteria 19 may be architected to take advantage of the modern Internet: reasonably high customer premises tail speeds with fibre backhaul from the exchange. Secure peer assist criteria architecture uses the network of network appliance nodes which are each programmed with the secure peer assist criteria 19 combined with a Super PoP CDN architecture, to drive the user's connection at maximum capacity, thereby ensuring that content is delivered in the highest quality, without perceptible interruptions.

In preferred forms the digital content 13 stored on the origin store 11 may be syndicated. For example the stored digital content 13 may be supplied as a store portal on anyone's web site just like YouTube puts a portal on web sites. The participating site owner may choose a sub-catalogue of titles from a master catalogue that are relevant to their audience.

The aggregator database 12 may include the following technologies in order to assist in applying appropriate security to the digital content 13 prior to delivery to the origin store 11:

Designed for security in layers from the ground up
The Secure Peer Assist network is designed to be secure, hidden and not discoverable
The Secure Peer assist network management system is protected by PKI and secure certificates
Secure Peer assist is "invisible" to BitTorrent Networks and is not analogous in its protocols to such networks
All Secure Peer assist protocols are standard Internet protocols or secure protocols with PKI security and verification
All digital content 13 is encrypted with Microsoft PlayReady DRM and secured within the network appliance TEE
PlayReady DRM is implemented in the hardware of the appliance within its trusted execution environment (TEE)
The appliance operating system is fully integrated with and utilises the hardware DRM to secure the media pipeline
In one embodiment, the appliance operating system may be Microsoft Windows
PlayReady key management is completely separate from and additional to network appliance TEE security and key management.
PlayReady DRM and decrypt is secured by the network appliance TEE
Key management and storage is performed within a secure application and environment on the appliance
In one embodiment, that secure key management system may utilise innovative secure enclave environments enabled by the processor architecture, instruction set, libraries, Application Programming Interfaces (APIs) and attestation services.

User Interface

With reference to FIG. 3 the network appliance 14 and an example visual display device 18 are shown in greater detail.

In this instance the network appliance 14 includes a processor or microprocessor 20 in communication with a memory 21. The microprocessor 20 is in communication with an input output device 22 by which signals can be sent to and received from an external digital device which preferably includes at least a visual display 23. The processor or microprocessor may include a graphics processing unit (GPU) or that GPU may be a separate processor, system or sub-system.

The memory contains code including code corresponding to the secure peer assist criteria 19 which enables the processor 20 to effect various functions including sending and receiving digital content 13 over a network 25. The network 25 may include the Internet 16, local area networks 26 and wide area networks 27 all intercommunicating with each other.

The digital content 13 will typically comprise a plurality of data packets 24 each of which comprises a header 24A and a payload 24B.

The payload 24B comprises digital data which may more specifically be audio data, video data, game data or other data.

Figure 9:
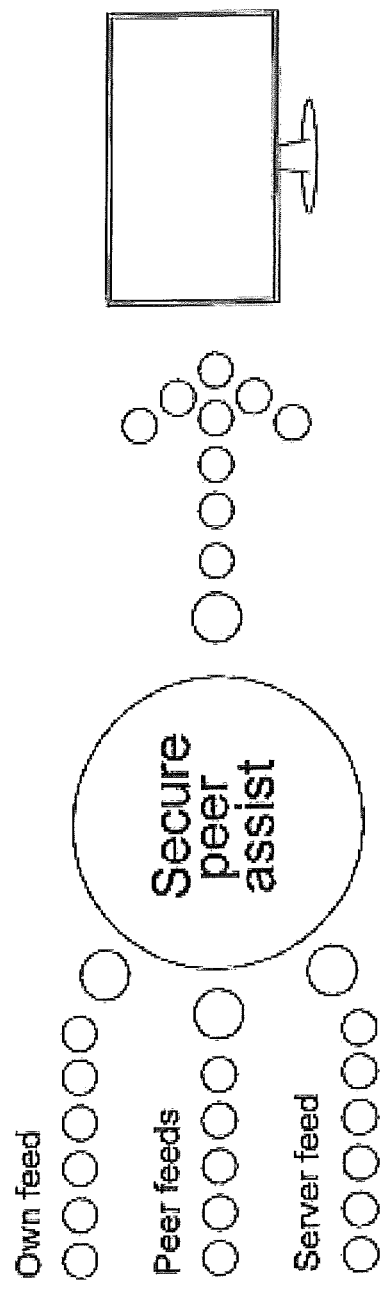
FIG. 9 is a flow diagram of data packet sources and data packet flow which may contribute in whole or in part to delivery of digital content under the system of FIG. 6.
Figure 10:
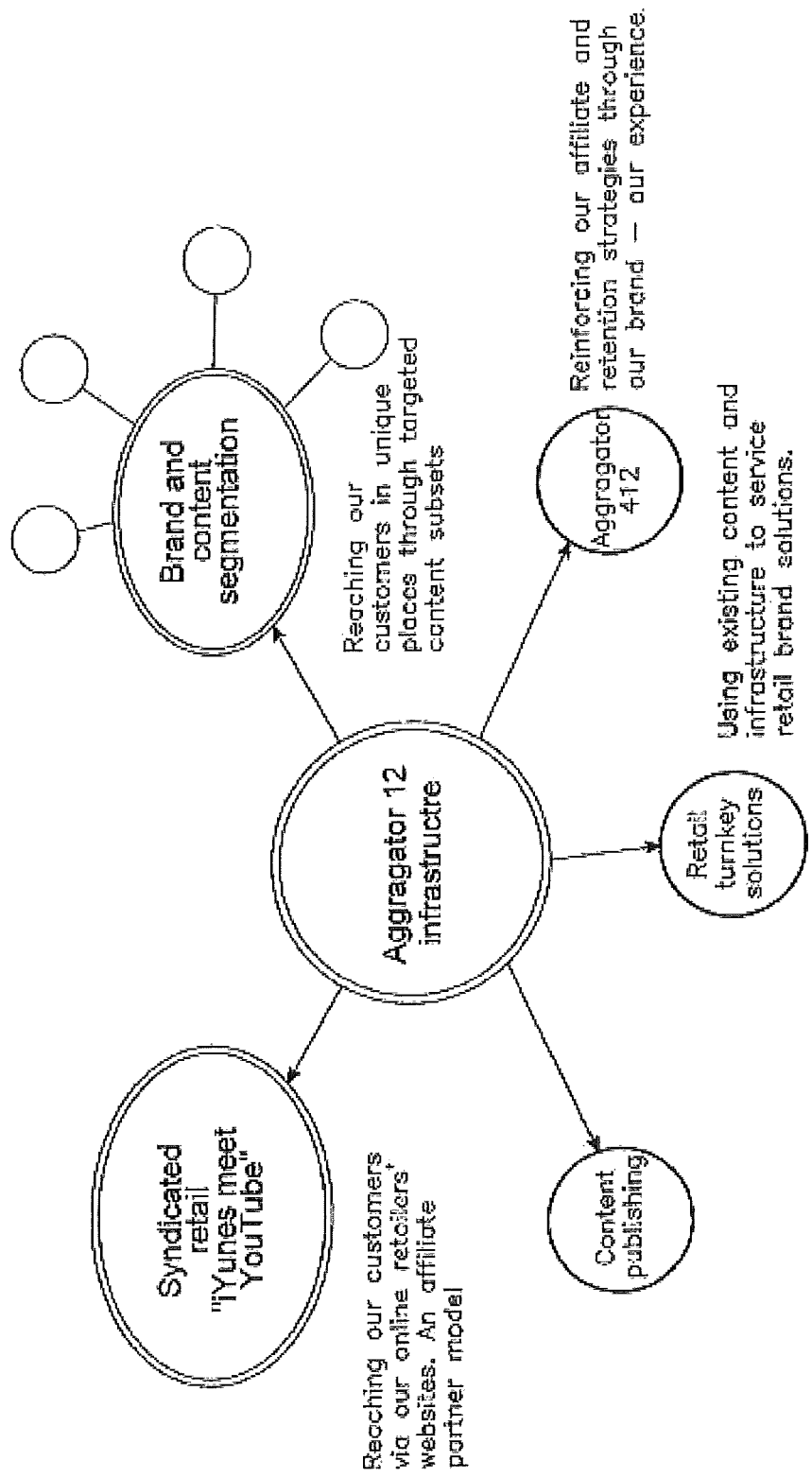
FIG. 10 is a conceptual diagram of the entire system of FIG. 6 including a methodology for syndication.

It is to be noted that the packets 24 will not necessarily arrive at the appliance 14 in sequential order. In a typical scenario different packets will arrive from different origins-in that regard refer to FIGS. 9 and 11.

The core function of the network appliance 14 is to controllably send and receive digital content 13 and to convert that digital content 13 locally into local signals 27 for driving an external digital device such as (but not limited to) audiovisual display device 18.

A further function of the network appliance 14 is to permit a user to control the "purchasing" and "playing" of digital content received by or sent from the network appliance 14.

In the preferred form, the user experience and user interface are kept as simple as possible. In the simplest form user control is effected simply by moving a cursor left or right via a remote control device. These actions control extremely simple menus and displays of content on the screen. These may be homogenous or blended i.e. pure menu or pure content display or a mixture of both. In one preferred form the displays are arcs or circles to reflect the user experience and control via the remote control device. In cases where there are a lot of items to display such as a large content library, the display may be concentric arcs or circles of content "tiles" i.e. clean graphical images of the "cover" of the content title. In another embodiment these tiles may be in a grid formation.

Navigation of menus is achieved by simple combinations of "left" and "right" navigation. At its simplest, a menu of action items may be navigated left or right by clicking left or right. In one example the menu may move correspondingly left and right under a selection graphical device such as a cursor box. In another example the selection graphical device may move left or right. Once highlighted, a menu item is selected by a simple single click. This may result in an action or in navigating deeper into the menu structure. Navigation "out" may be by double click. Alternately there may be menu navigation items such as "back" or "cancel". For navigation of large numbers of objects such as video libraries, these may be displayed in concentric arcs or rings or in a grid of tiles. The rings may be navigated "in" by clicks and "out" by double clicks and left and right by clicking left or right. Items, tiles, arcs or rings selected may be highlighted by increasing focus and/or size. Items, tiles, arcs or rings not currently selected may be reduced from focus by moving away from the centre of focus and/or "defocusing" the items or reducing them in size. This may give the effect of unselected items, tiles, arcs or rings moving "away" form the user and selected items, arcs or rings moving "toward" the user.

More sophisticated use may be supported by control mechanisms such as rate or distance dependent actions. A small action may result in a slow, short movement of the menu or item. A larger action may result in a faster, longer movement of the menu or item. Similarly, the rate of action may also determine the scale or nature of the menu action. This may be independent of distance of action or related.

In the preferred form the user graphical display is very simple, clean, uncluttered and crisp to provide a feeling of simplicity and ease of use.

Figure 5A:
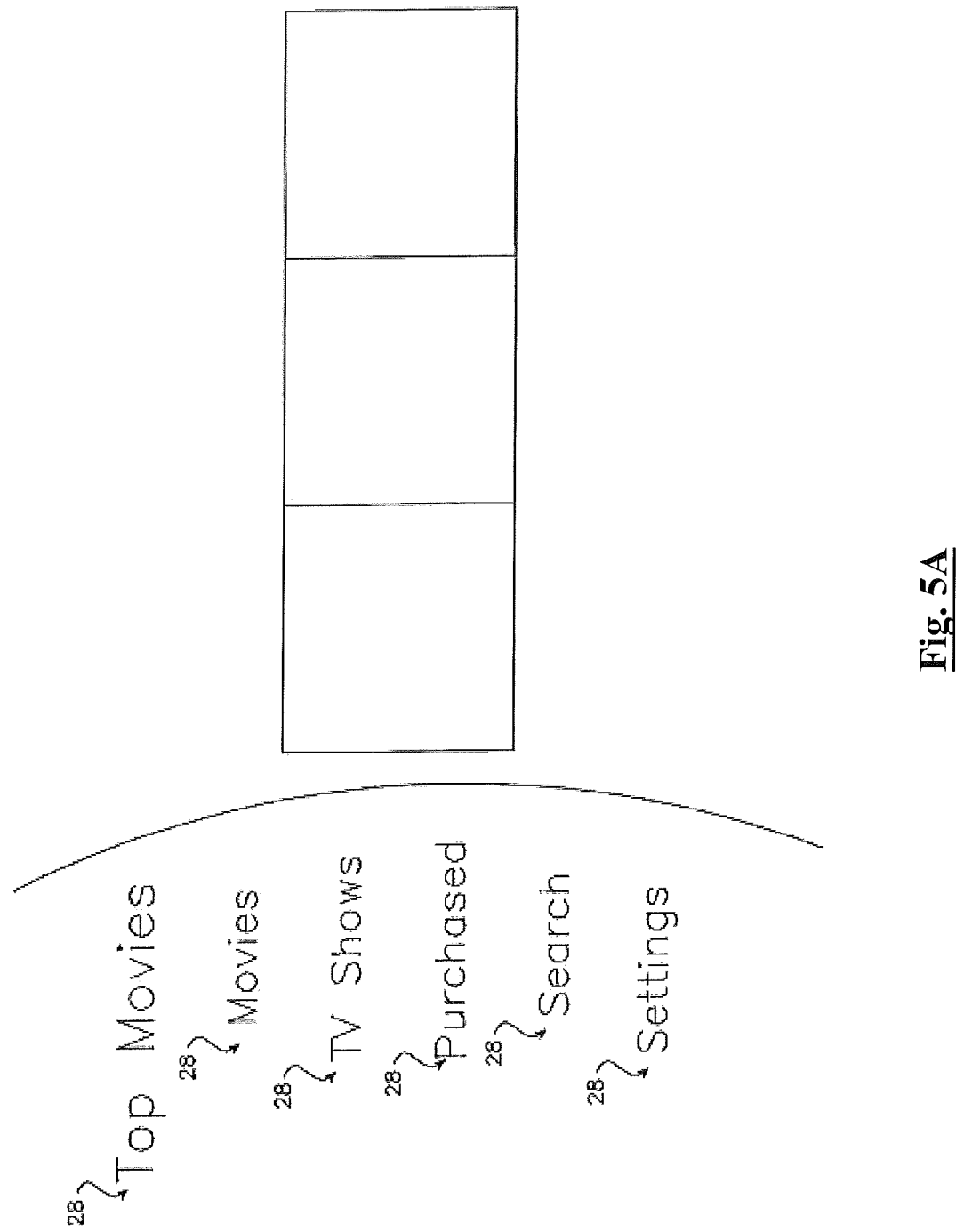
FIGS. 5A through to 5F are video output views showing further graphical structures that are utilised interactively with the modes of operational control of the appliance of FIG. 3.
Figure 5B:
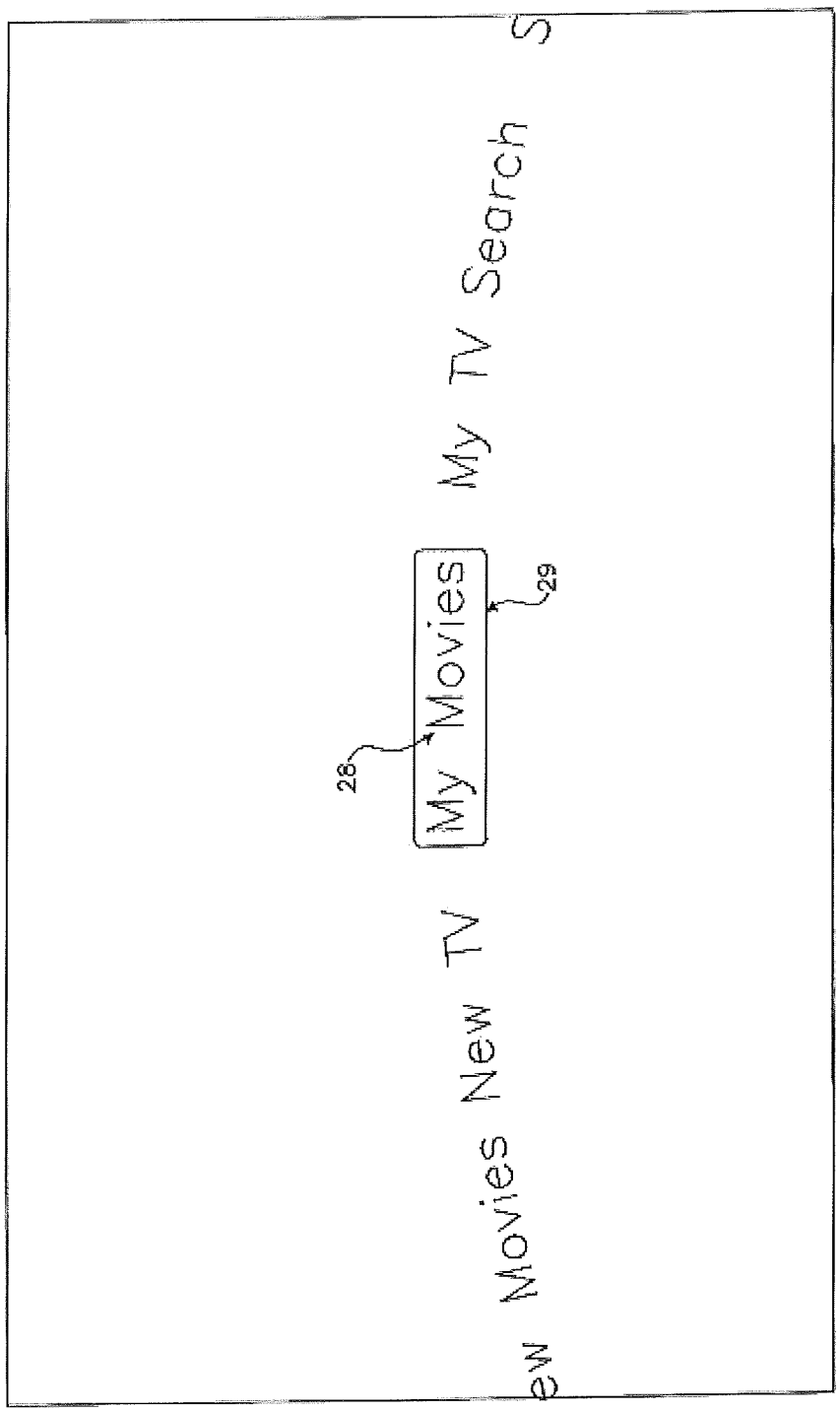
Figure 5C:
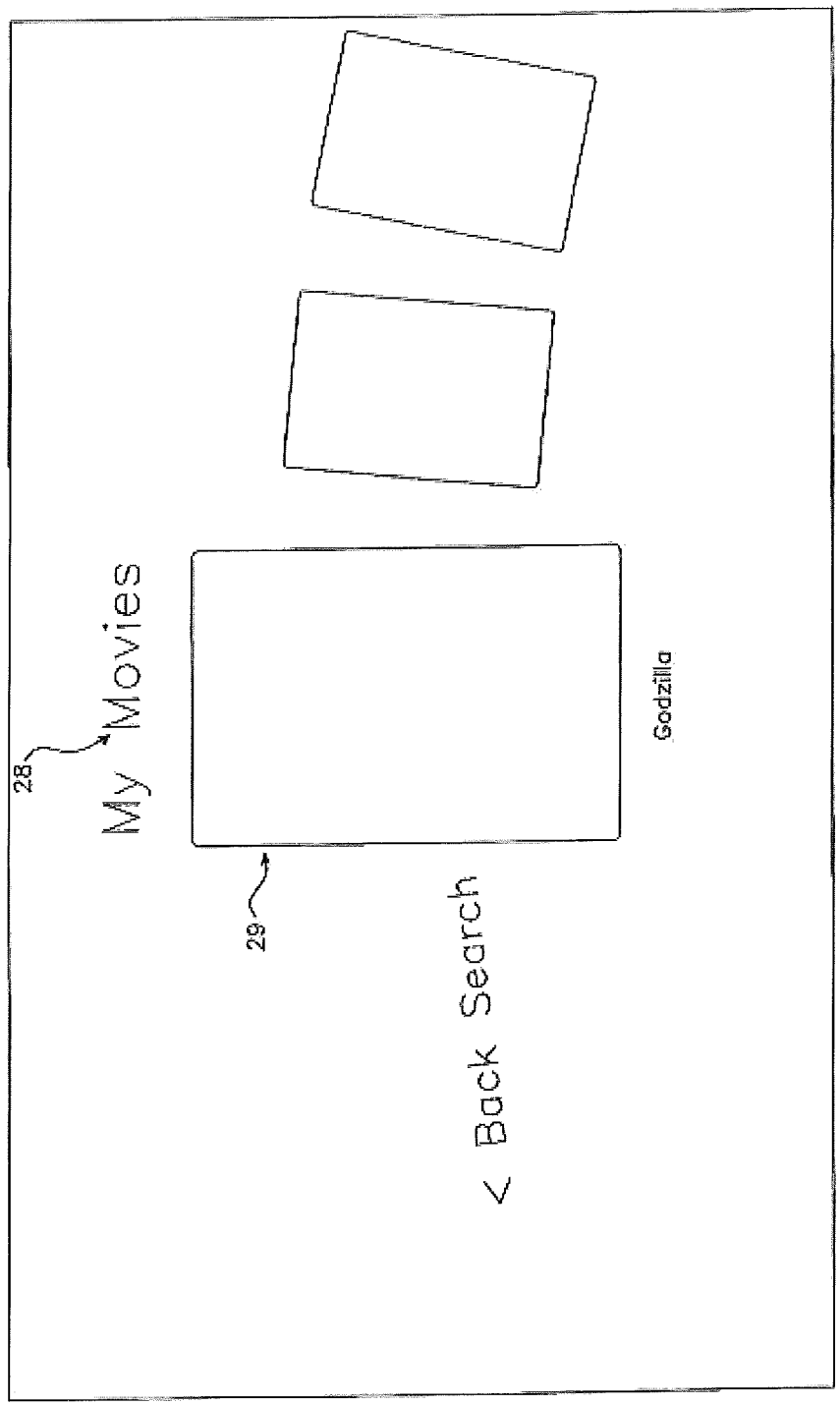

For example, with reference to FIGS. 5A through to 5F a sequence of operation can be as follows: graphical structures 28 lie on a substantially vertically disposed arc are shown in FIG. 5A or maybe on a substantially horizontally disposed arc shown in FIG. 5B. A user manipulates the cursor 29 device to surround a chosen one of the graphical structures 28 for example to designate the "my movies" graphical structure.

Figure 5D:
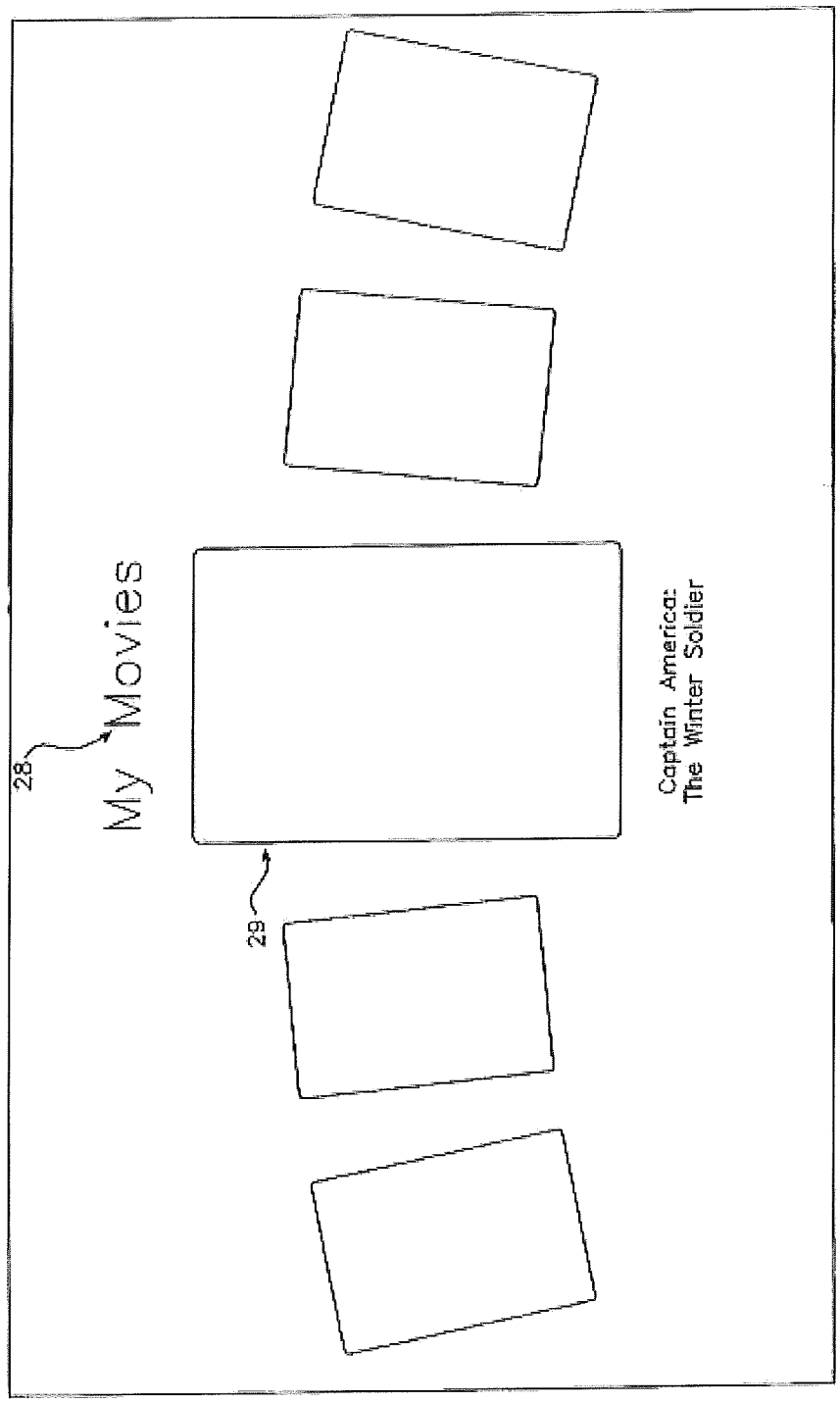

The user may then move the cursor through a series of, in this instance, movie selections to designate the "Capt. America" movie selections as shown in FIG. 5D.

Figure 5E:
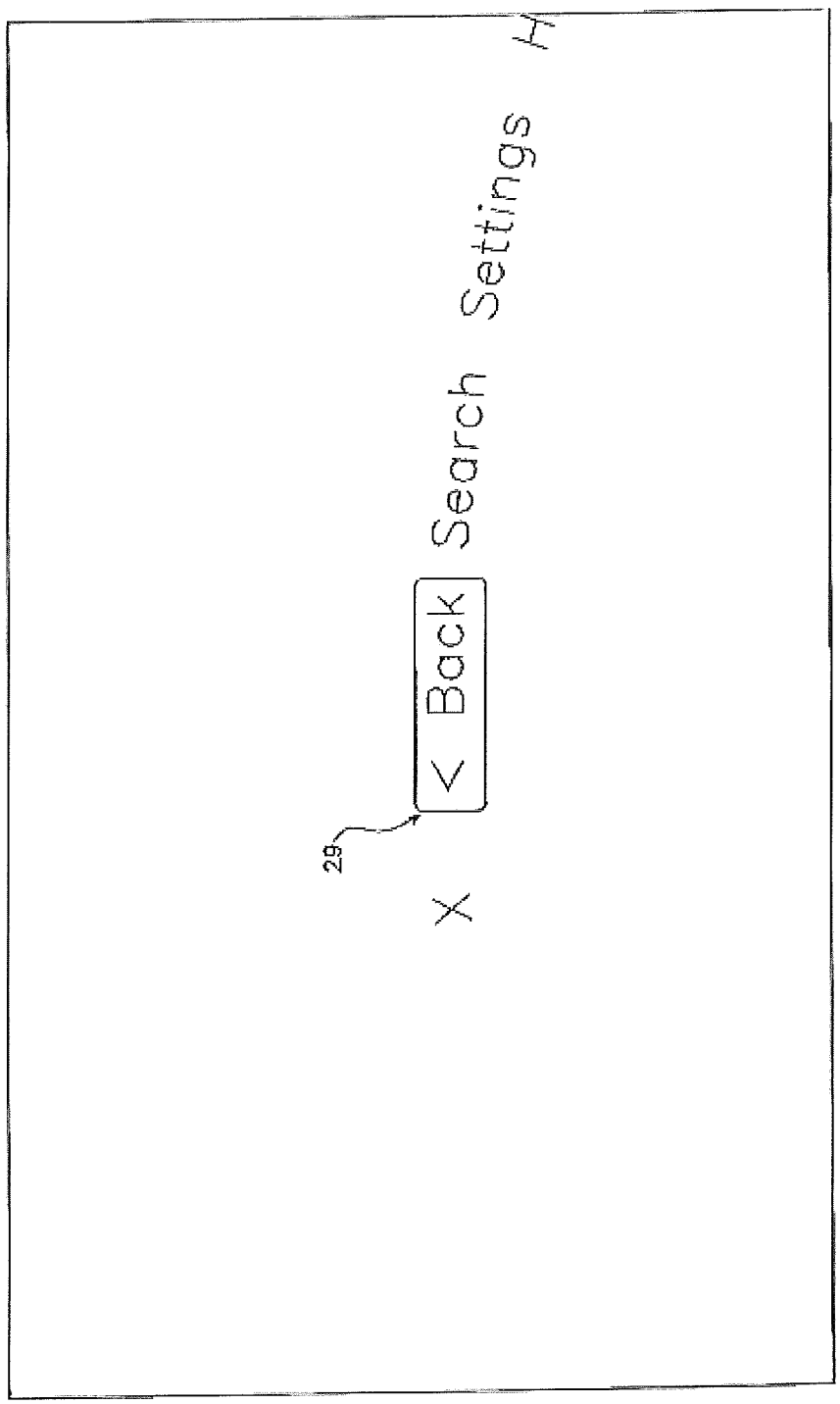
Figure 5F:
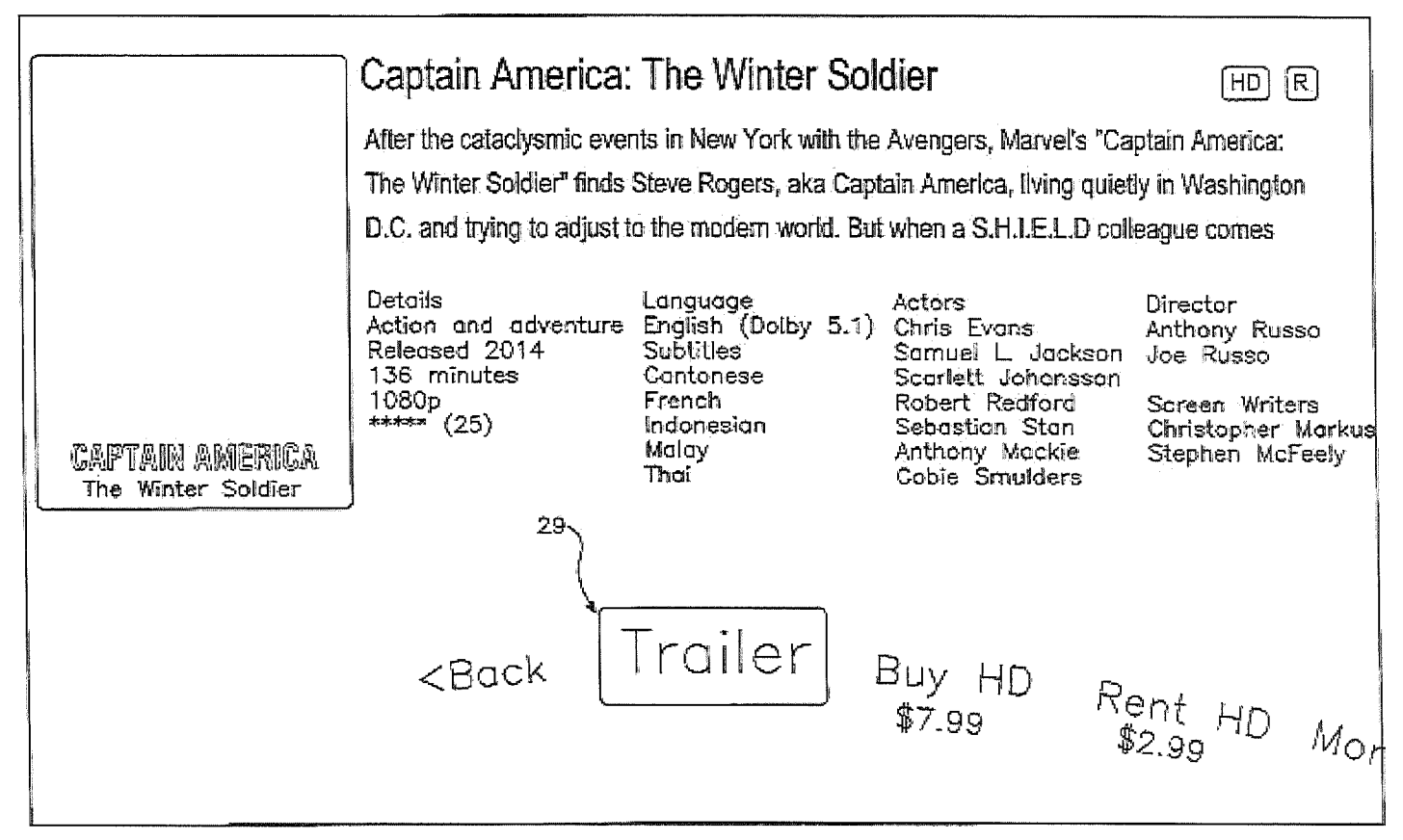

At any time a user may "back out" of the current menu item so as to move up one level to the series of graphical structures 28 shown in FIG. 5E. FIG. 5F shows details of a particular selection when the "Capt. America" graphical structure was shown highlighted by the cursor 29 (FIG. 5D in a purchase menu in the store context obtainable from syndicated webstore 41—refer FIG. 6).

In another form this can be effected by control of a cursor 29 in the form of a rectangular-shaped border device in association with graphical structures 28 displayed on visual display 23, in this instance of audiovisual display device 18.

In a particular form the graphical structures 28 may lie on an arc or circular path.

In one form these controls may be "simulated" in a remote-control application on for example a smart phone connected wirelessly or via the Internet to the main network appliance 14 or a "satellite" network appliance 14 forming a home network.

In another form these controls may be embodied in a TV remote controller or a game controller.

In another form these controls may be duplicated on a smaller version of the network appliance 14 wirelessly connected to the main network appliance 14 or a "satellite" network appliance 14 forming a home network.

Figure 6:
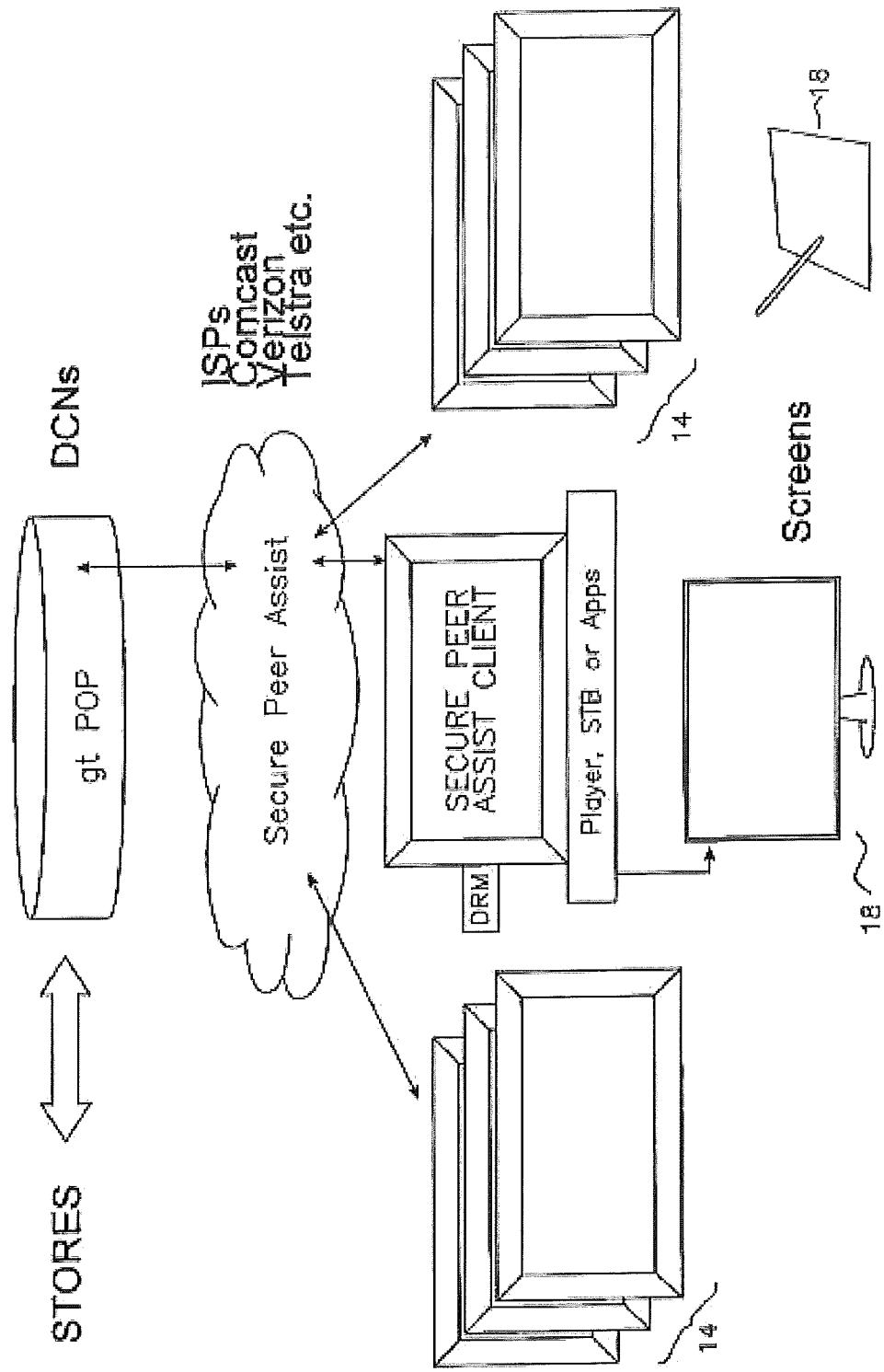
FIG. 6 is a block diagram of a media distribution and management system in accordance with an implementation example.
Figure 7:
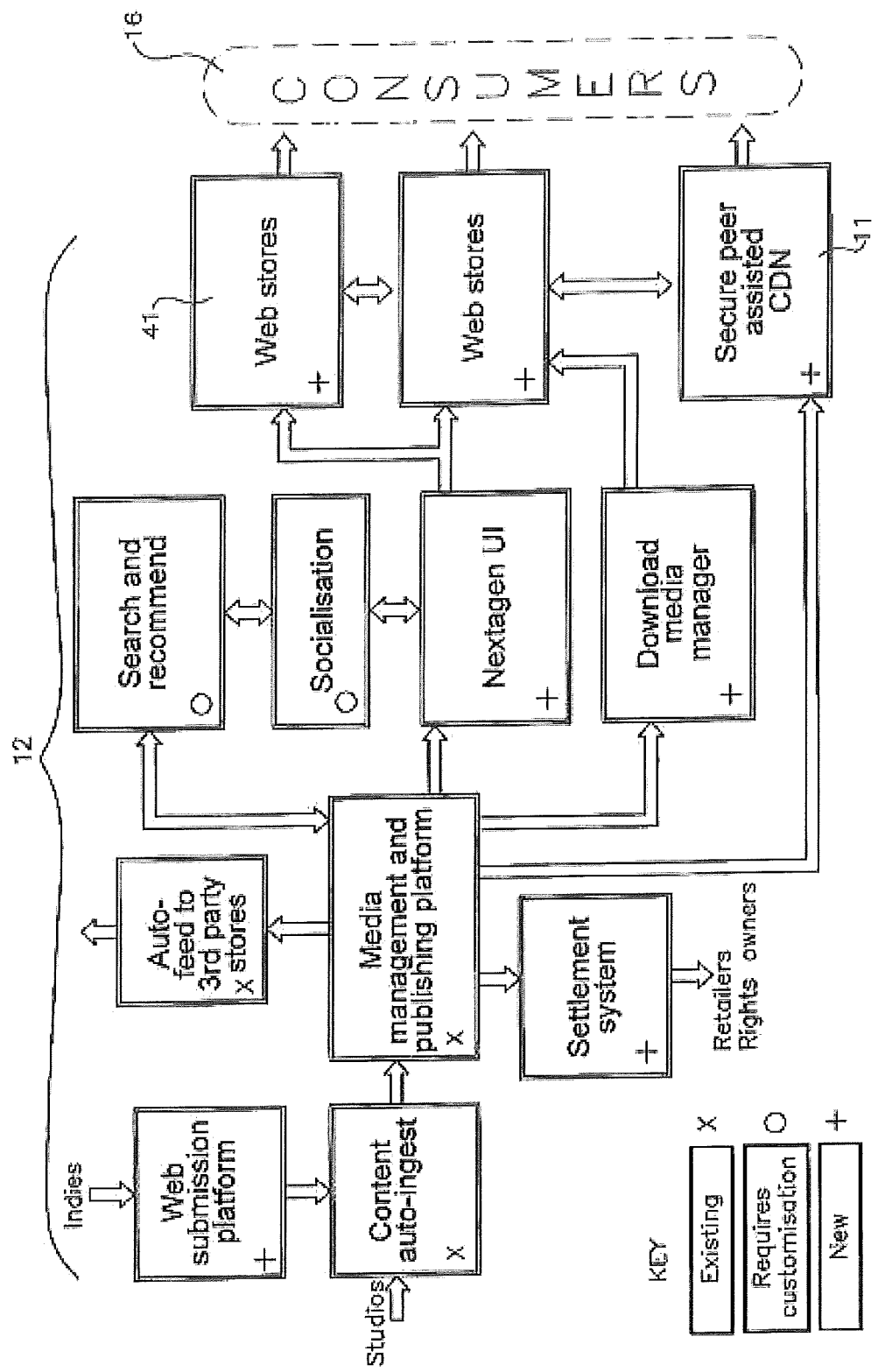
FIG. 7 is a block diagram of the aggregator of the system of FIG. 6.

As exemplified in FIGS. 6 and 7 these UI concepts permit streamlined control of operation of the network appliance 14 including most particularly selection of digital content 13 for viewing on the audio visual display device 18. Significant is the reflection of the physical user experience in the UI e.g. arcs for menus and images, concentric circles (or arcs) to show menus or titles, blending of menu and images, in one embodiment in circles and arcs. In another embodiment menu and images may be displayed in a grid of tiles.

First Example of Implementation

Figure 8:
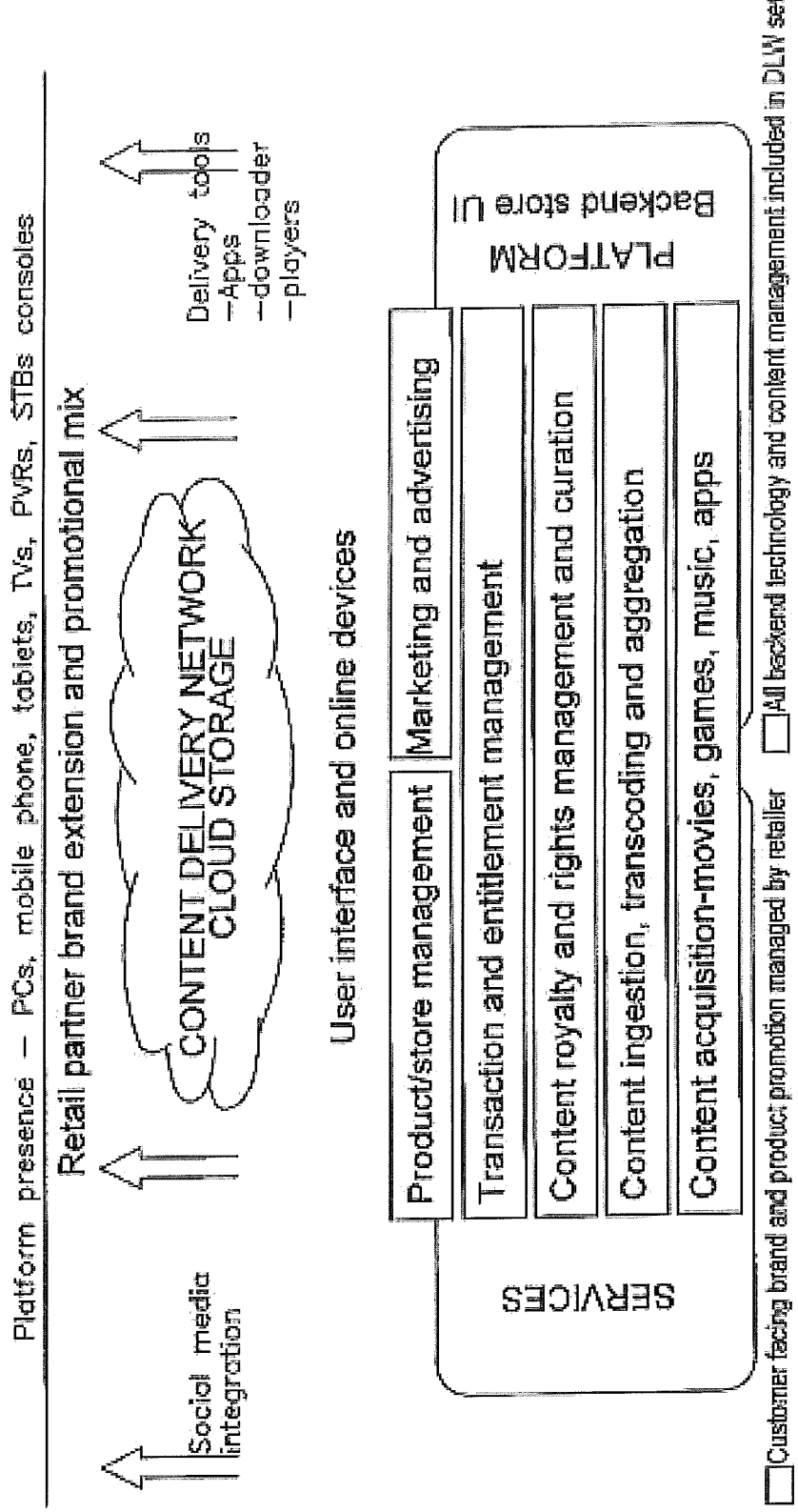
FIG. 8 is a flow chart of service functions which give effect to the aggregator and origin store of the system of FIG. 6.

In preferred forms the network appliance 14 includes at least the following capabilities:
Connect to Internet via WiFi or Ethernet cable
Connect to TV via HDMI or WiFi interface
Connect to USB or HDMI for TV control
Connect to other devices e.g. tablets, PCs via WiFi or Ethernet
Secure peer assist criteria network client
Microsoft PlayReady secure client
Trusted Execution Environment
Play Movies, TV and games
"remote" functions e.g. seek, pause, rewind, fast forward, slow motion via apps or via appliance or smaller version of appliance wirelessly connected to "home" appliance
Remote functions via TV control, game controller, keyboard, track pad or mouse
Stream, download and store all content (with mass storage option)
Sideload games to other game platforms, tablet, phone
HD and UHD ("4K")
Manage library including third party content
Securely share content. Content will be DRM protected and a mechanism provided to purchase a key to unlock the content
Record and send metrics/stats to management systems
Monitor and manage content behaviour and performance
Monitor and manage network behaviour and performance
Media hub The overall topology of the example system can be as illustrated in FIGS. 6, 7 and 8 and having the functional specifications as follows:

Functional Description

Embodiments of the network appliance 14 of the present invention comprise a device operating according to secure peer assist protocol 19 being a portable device for downloading, storing, streaming, playing and sharing high quality movies, games and TV on a TV or connected device. It combines secure peer assist criteria 19 technology and a content origin store 11 and a syndicated retail content web store 41 to provide the latest Hollywood and Indie movies, TV and games in true HD and UHD on a TV. Embodiments of the network appliance 14 address the key issue in OTT and IP TV delivery today: exponential growth of video traffic. In this instance the network appliance 14 provides the flexibility for a new generation of content owners who can choose what they want to watch, when they want to watch it and who and how they want to share it with in true High Definition and Ultra High Definition, all the time.

Functions:
Connect to Internet via WiFi a, b, g, n, ac or Ethernet cable for download and stream of movies and TV from GT TV store
Option for Bluetooth e.g. to connect to TV or other devices
Connect to TV via HDMI v 2.0a and HDCP 2.2 interface or later versions as the standards evolve
Full HD 1080p60, UHD (4K UHDTV 2160p 3840×2160) and HDCP secure HDMI Connect or via fibre to high quality audio sound systems supporting high quality audio e.g. Dolby 5.1 or 7.1
Support wide range of video encoding standards including H.264 all codecs
H.265 HEVC and VP9 and Alliance for Open media codecs
3×USB interfaces for connection to other devices, peripherals, TV control
PSU for power
Connect to other devices e.g. phone, tablet, PC via WiFi or Ethernet
Remote control and store purchase initially
Streaming via Miracast and DRM
Secure Peer assist network client in secure environment Play Movies, TV and games including "remote" functions e.g. seek, pause, rewind, fast forward, slow motion Microsoft PlayReady secure client Sideload games to other game platforms, tablet, phone via Ethernet, WiFi or USB (future release)

Stream, download and store all content (with mass storage option)

HD and UHD

Manage library including third party content

Securely share content

Record and send metrics/stats to management systems content behavior and performance network behavior and performance Media hub Universal Plug n Play UPnP Models All models will be designed for a single enclosure to minimise cost of production. This will be a high aesthetic form and function device with a simple and innovative human interface. It will be designed to appeal to the super early adopter market but also the mainstream market. It will be extremely simple to use.

Base model: This is the base model with minimum 2 TB disc and 128 G SSD storage. It will be a fully functional peer in the Secure Peer assist network, enabling high quality download and streaming of movies and TV from the store 41. It will be controlled via the unit, via a phone or tablet app or via TV remote or keyboard, track pad or mouse.

Base model with disk library: This is the base unit with minimum 2 TB 2.5 inch disk drive for storage of movies. It will be capable of storing 200-400 HD movies or 100 UHD movies, depending on encode size.

SSD model with SSD library: This is the base unit with 250 G-2 TB SSD hard drive. It will store 100 UHD movies, depending on encode size.

Media hub and streaming: This will allow secure streaming of digital content to CE devices such as phones and tablets, and streaming of user's content to the TV.

Network Appliance Control App

The network appliance 14 may be controlled by an app on a phone or tablet. This may be an Android or iOS app initially for iPhone and tablet. Other applications will be implemented in future. It may provide full remote control of all viewing functions, as well as the ability to purchase directly via the network appliance accessible store.

It may optionally also remotely control the TV via USB or Bluetooth if equipped or via the network appliance 14.

Power

In preferred forms, the system must be as low power as possible. The system may be powered by AC power pack. The system may be optionally battery powered.

Operating System

The system may run a secure, real time version of the Linux operating system or the Microsoft Windows operating system.

Architecture

In the example 1 system, the system architecture may be ARM Cortex A9 or later, including ARM TrustZone or it may be Intel Core architecture $6^{th}$ generation or later, including Secure Guard Extensions (SGX), Memory Protection Extensions (MPX), secure enclaves and hardware DRM.

Security

In the example 1 system, all media files will be DRM encrypted. Preferred DRM are Microsoft PlayReady for movies, Ubisoft DRM or Tages Solid Shield for games but other studio approved DRM may be used including Adobe Access and Google Widevine. The system may provide a robust and long term solution where trusted applications are appended in the field over the lifetime of the device. The system may conform to the specification of a Trusted Execution Environment. The system may support trusted boot mode and trusted control of all I/O ports.

The system may support Intel Secure Guard Extensions (SGX), Memory Protection Extensions (MPX), secure enclaves and hardware DRM The system may support secure attestation and sealing The system may support ARM Advanced System Architecture and Base Architecture platforms for digital rights management (DRM), with integration of the TrustZone Address Space Controller (TZASC) to protect areas of the RAM used to hold valuable content.

The architecture may support integration of media accelerators, such as GPU, Video Engine and Display controller, all of which will require knowledge of the processor's security state.

The system may provide tamper protection and real time clock.

The system may support secure hardware cryptographic acceleration to optimize DRM decoding speed. The system may support high assurance boot and recognition of digitally signed software.

The system may support Secure JTAG-JTAG i.e. use is restricted (in the No-Debug level) unless a secret-key challenge/response protocol is successfully executed.

DRM

The system of example 1 in preferred forms will support digital rights management (DRM). Microsoft PlayReady is preferred for movies and TV and Ubisoft DRM or Tages Solid Shield for games initially. Other studio approved DRM e.g. Adobe Access and Google Widevine are alternatives.

Hardware & O/S

CURRENT hardware & O/S specification

I/O ports/aerials

AC power adapter

3×USB 2.0

1×1000 Mb Ethernet

HDMI 2.0a connector

WiFi a, b, g, n, ac

HiFi sound optical or HDMI

Mass storage 2.5 inch disk drive 2 TB minimum

SSD 128 G-1 TB minimum

Figure 14:
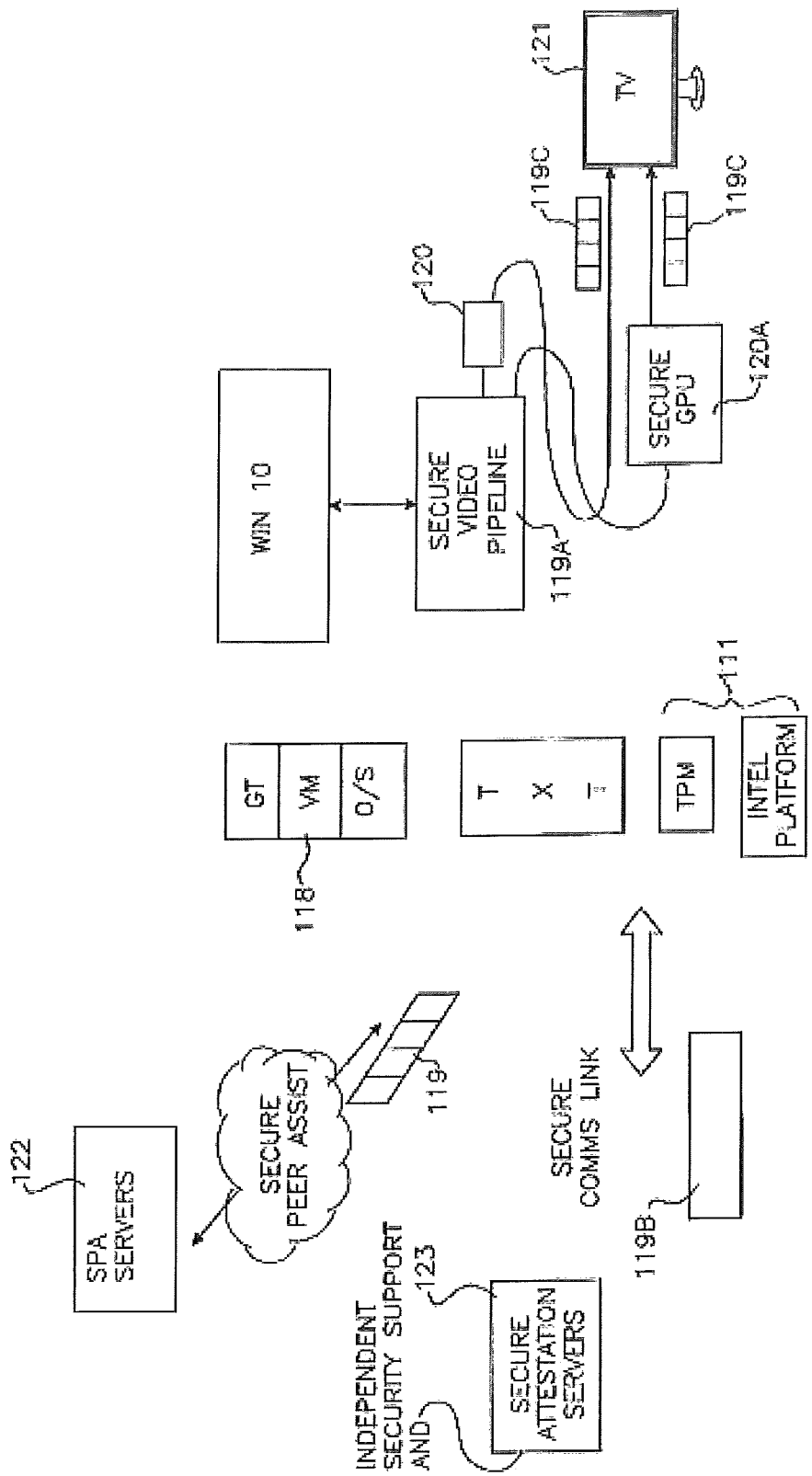
FIG. 14 is a block diagram of data functionality operable with the further embodiment of FIG. 12.

With reference to FIG. 14 there is illustrated a conceptual flow diagram for syndication of digital content 13.

By way of summary, there is described the system of example 1 and preferably implemented via network appliances 14 of the type described with reference to FIG. 3.

Preferred forms of criteria for receipt of data packets at the network appliances operate according to one or more of the following, alone or in combination:

a. most needed packet b. fastest download speed c. least latency d. the network address from where the next digital bit or group of bits can most easily and efficiently be acquired in order to maintain real-time or near real-time delivery of digital content.

Preferably, digital content and more particularly specified items of digital content are DRM 'wrapped', delivered to the network appliances and decoded at the network appliances utilising the Microsoft PlayReady infrastructure.

Figure 11:
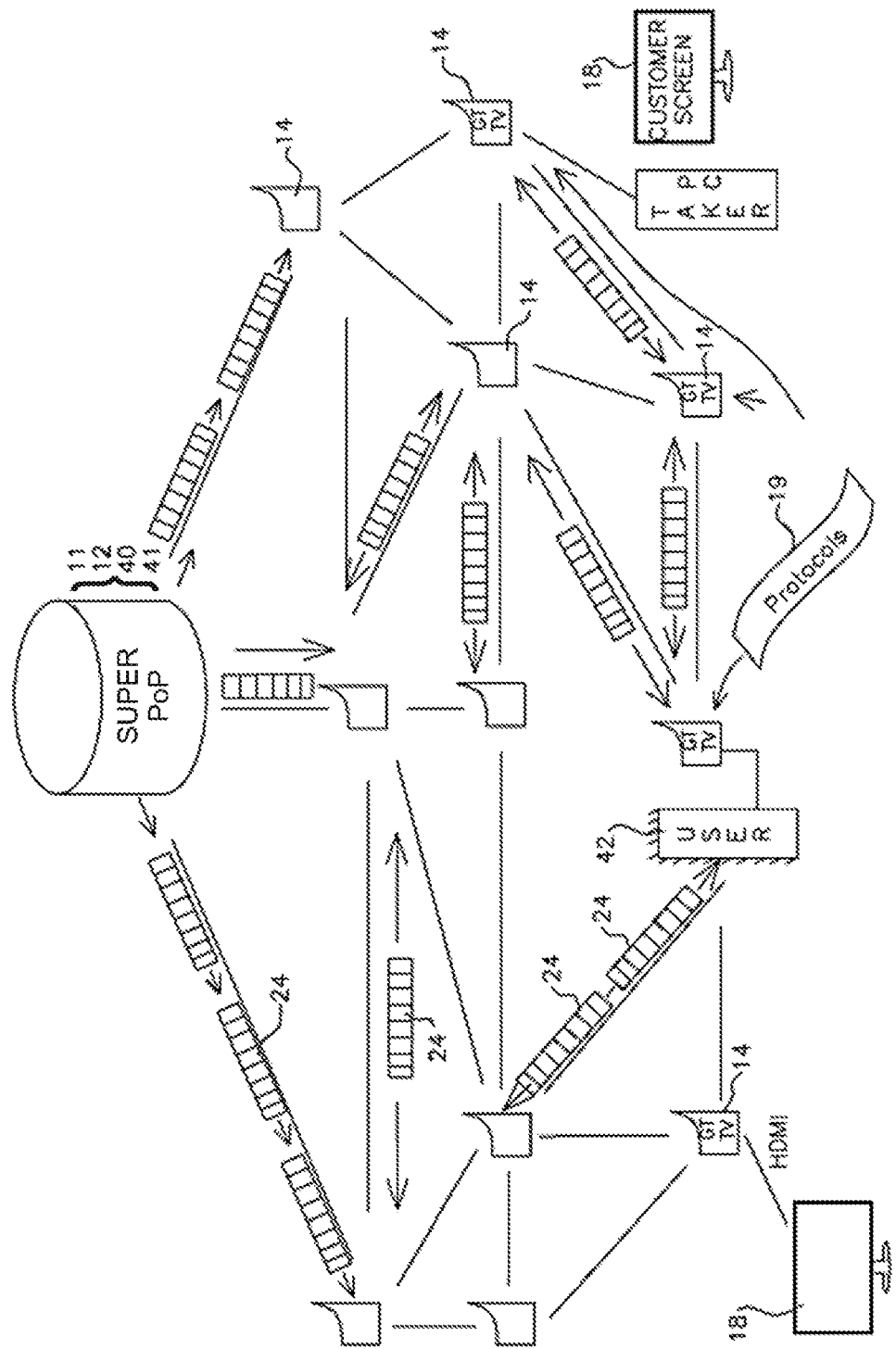
FIG. 11 is a block diagram of an embodiment of the system of FIG. 2A conceptualised from a user perspective.

With reference to FIG. 11 there is illustrated the system 10 conceptualized from a user perspective.

Broadly there is a "Super PoP" in this instance combining aggregator database 12, origin store 11 and the data packet address database/network management server 40 which, in conjunction with the distributed network appliances 14 and preferably using the Internet as the primary communication channel, orchestrates the efficient and timely delivery of data packets 24 (forming specified items 17 of digital content 13) thereby to allow secure and timely delivery of a wide array of digital content to the user 42.

The system enhances the experience for all stakeholders by providing confidence in the security of the digital data to the originators and rights owners of the digital data whilst also providing a wide array of digital content for the selection of the user 42 all delivered in a controlled and timely manner such that both substantially real-time streaming as well as data download are available over a wide range of Internet connections.

Further Preferred Embodiment

Figure 12:
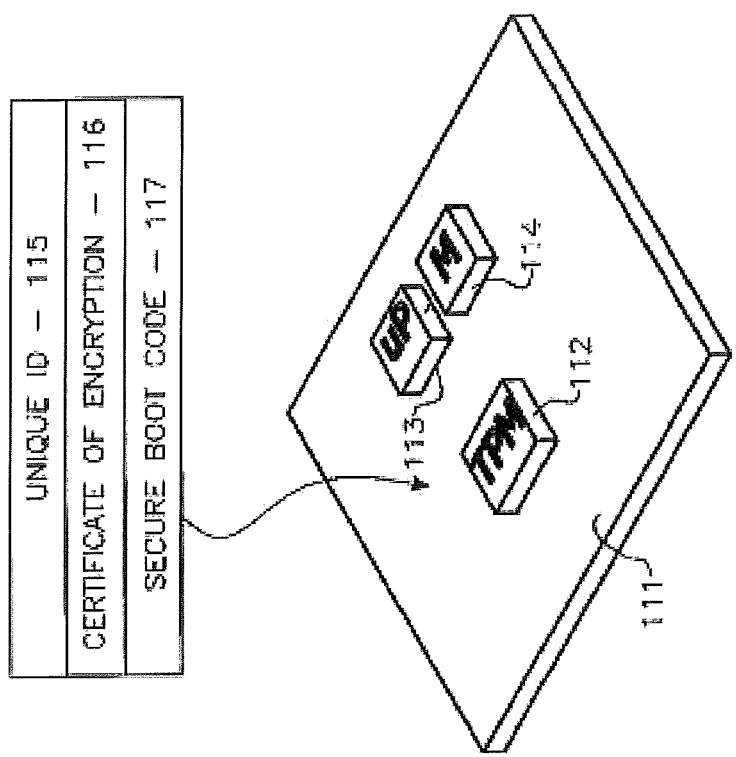
FIG. 12 is a layout diagram of a processor module in accordance with a further embodiment of the present invention.
Figure 13:
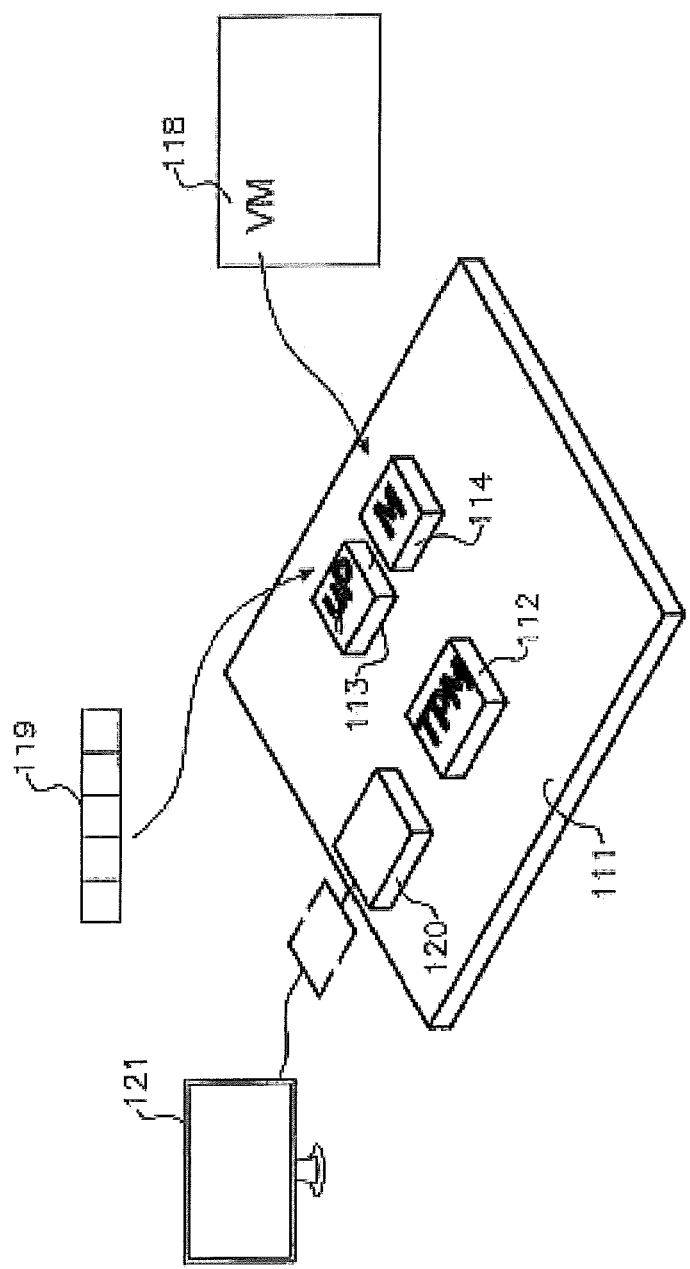
FIG. 13 illustrates diagrammatically some of the module functionality of the module of FIG. 12.

With reference to FIGS. 12, 13 and 14 there is illustrated a basic platform and functional implementation of a further embodiment of the present invention which can be implemented using Intel brand chip sets and Microsoft Windows brand software modules.

It will be appreciated that it will be advantageous for at least some embodiments of the present invention to operate in a highly secure state whereby potentially valuable software such as ultra high definition (UHD) movies may be processed without fear of being compromised or made available for unauthorised use.

Typical UHD movies operate according to MPEG4 standards such as H.264 (so called HD definition typically operating at 1080 pixels or lines down the screen) and H.265 (so called 4K or UHD definition operating at 2160 lines or pixels down the screen). A typical file for such a movie may be of the order of 15-20 GB in size. In the present further preferred embodiment the "secure peer assist" arrangement described in earlier embodiments is enabled on a Windows/Intel platform.

With reference to FIG. 12 there is illustrated a circuit board 111 on which is mounted at least a trusted platform module (TPM) 112 in communication with a processor 113 and memory 114. Alternately the TPM may be embodied in the processor 113 or an associated system module.

The trusted platform module 112 includes a unique identifier 115, a certificate for encryption and decryption 116 and secure boot code 117.

The trusted platform module 112 implements Trusted Computing Group architecture in this instance on hardware which is part of the TXT platform available from Intel Corporation providing a Trusted Execution Environment (TEE) incorporating Intel Secure Guard Extensions (SGX), Memory Protection Extensions (MPX), secure enclaves and hardware DRM In a preferred arrangement where the TPM is incorporated in the processor or an associated module the processor supports Intel Secure Guard Extensions (SGX), Memory Protection Extensions (MPX), secure enclaves and hardware DRM In a preferred form DRM is implemented utilising the Microsoft PlayReady environment. In this arrangement UHD 4K content will play if and only if:
   a hardware DRM environment is detected
   that environment is within a trusted execution environment and
   all video outputs are implemented using a preferred output protocol, in a particular preferred instance being HDCP 2.2.

In operation the trusted platform module 112 permits the processor 113 to enter into a trusted running state.

A preferred operating system loaded into memory 114 for execution by a processor 113 is the Microsoft Windows 10 operating system or a later version.

With reference to FIG. 13 the processor 113 and memory 114 may optionally execute a virtual machine 118 within the Intel architecture environment. The virtual machine 118 permits direct hardware access by an operating system such as the Windows 10 operating system whilst operating within a highly secure environment. A movie file 119 downloaded to memory 114 utilising the secure peer assist arrangement of previous embodiments may be processed and the video stream decoded via hardware DRM and an HDCP Level Shifter Protocol Converter (LSPCON) chip 120 for secure output via HDMI, Display Port or Thunderbolt connection to preferably ultra high resolution display device 121.

Alternately the video stream may be securely routed to a secure GPU 120A for secure output via HDMI.

With reference to FIG. 14 the flow of data on platform 111 is illustrated diagrammatically. The movie file 119 assembled potentially from many sources preferably in the form of secure peer assist platforms 122 is processed by the components including optionally virtual machine 118 operating within a Windows 10 environment utilising hardware DRM providing a highly secure output stream 119A which is processed by a converter chip 120 (preferably an HDCP 2.2 LSPCON chip) in order to output a secure video stream 119C displayable on ultra high resolution display device 121.

The trusted execution environment and stream 119A is secured via data 119B provided from independent security support and attestation servers 123 as illustrated in FIG. 13.

The end result is an output stream 119C to ultra high resolution display device 121 which has been decoded in real time whilst a high level of security has been maintained thereby permitting substantially real time display of very high resolution video files such as UHD 4K definition movie files in accordance with Movielabs and Motion Picture Association of America specifications and individual studio and content owner specifications for high value content.

Figure 15:
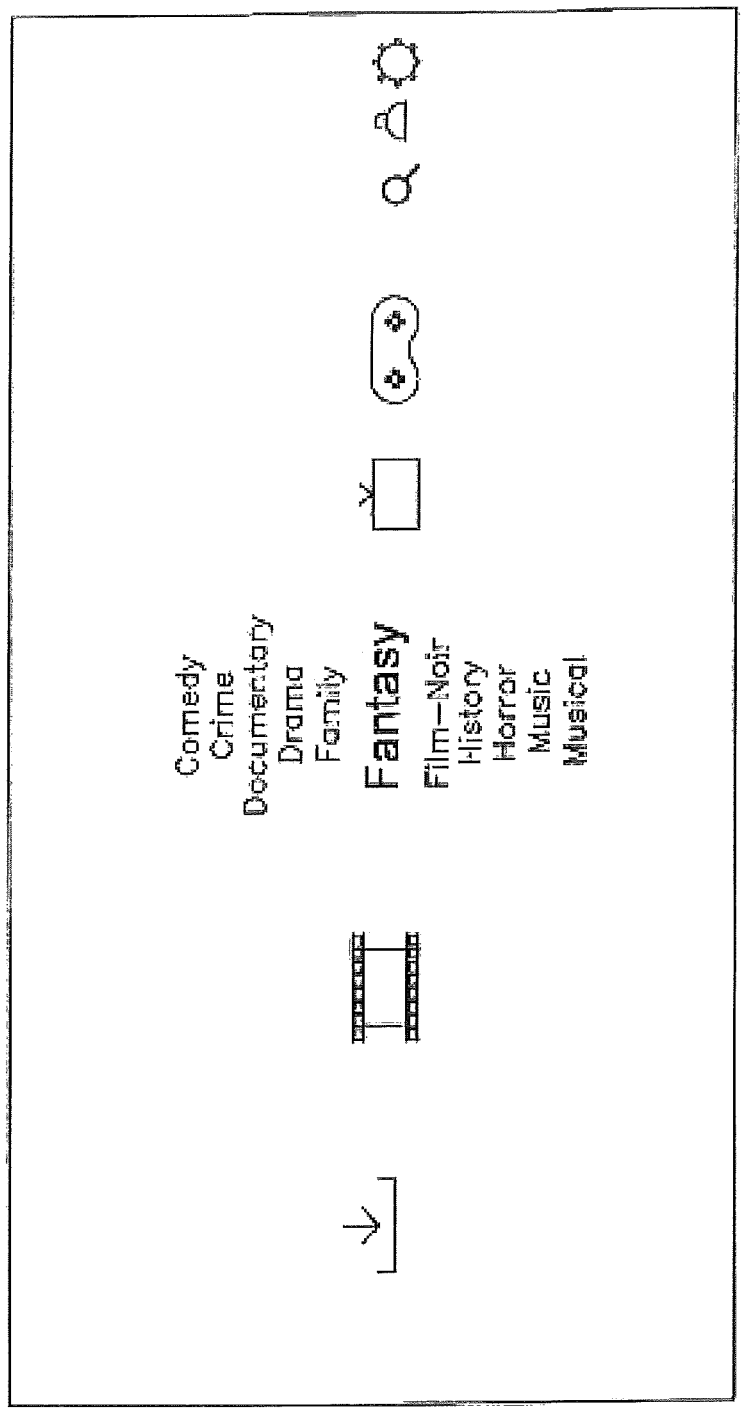
FIG. 15 is a screenshot of a menu screen output from the embodiment of FIG. 12.

FIG. 15 is a screenshot of a menu screen output to screen 121 by which a user may select a movie for watching on the display 121.

Figure 16:
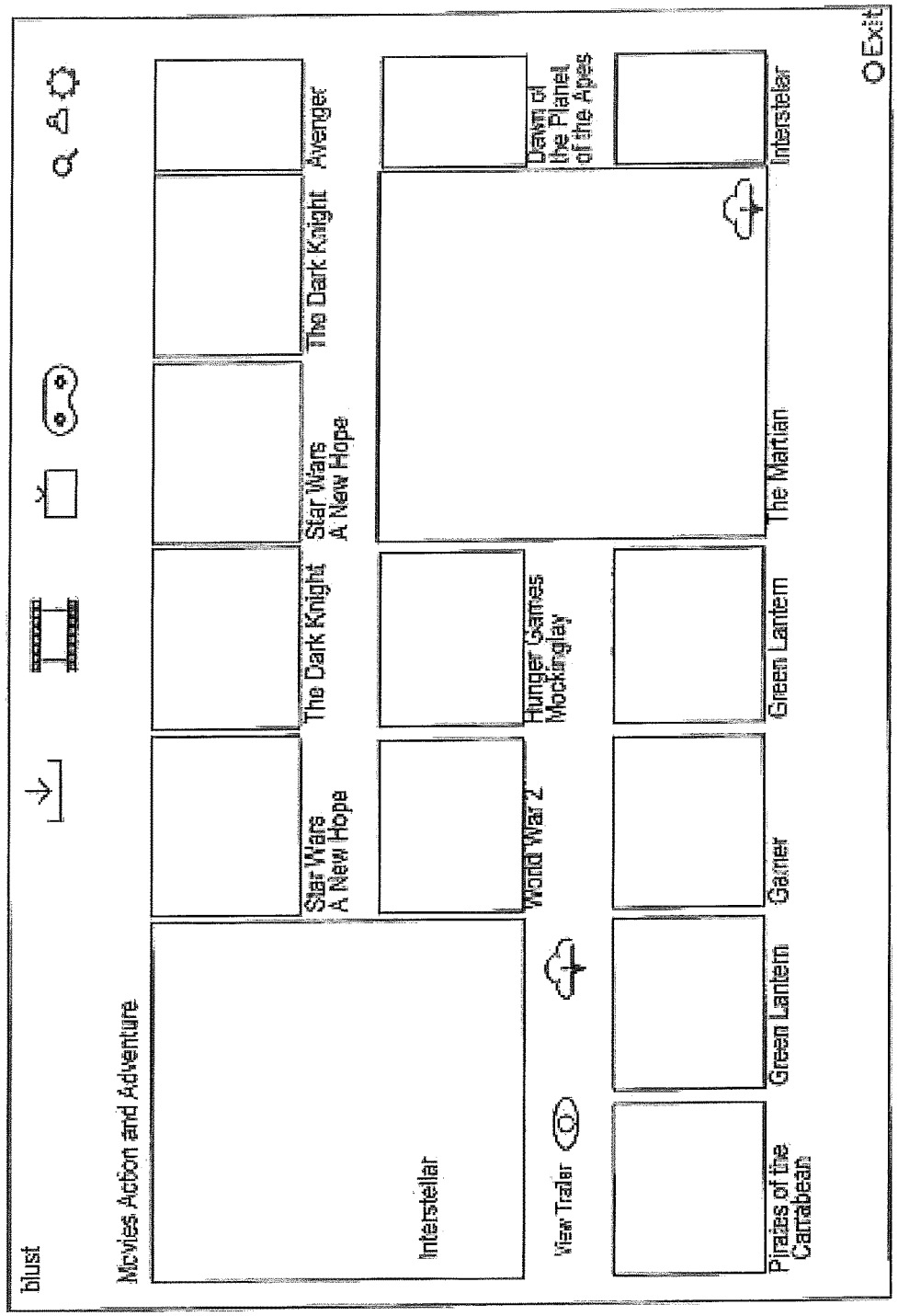
FIG. 16 is a screenshot of a menu selection screen output from the embodiment of FIG. 12.

FIG. 16 is a screenshot of a menu selection screen by which a user may select a movie for watching on the display 121 utilising a scrolling arrangement.

Figure 17:
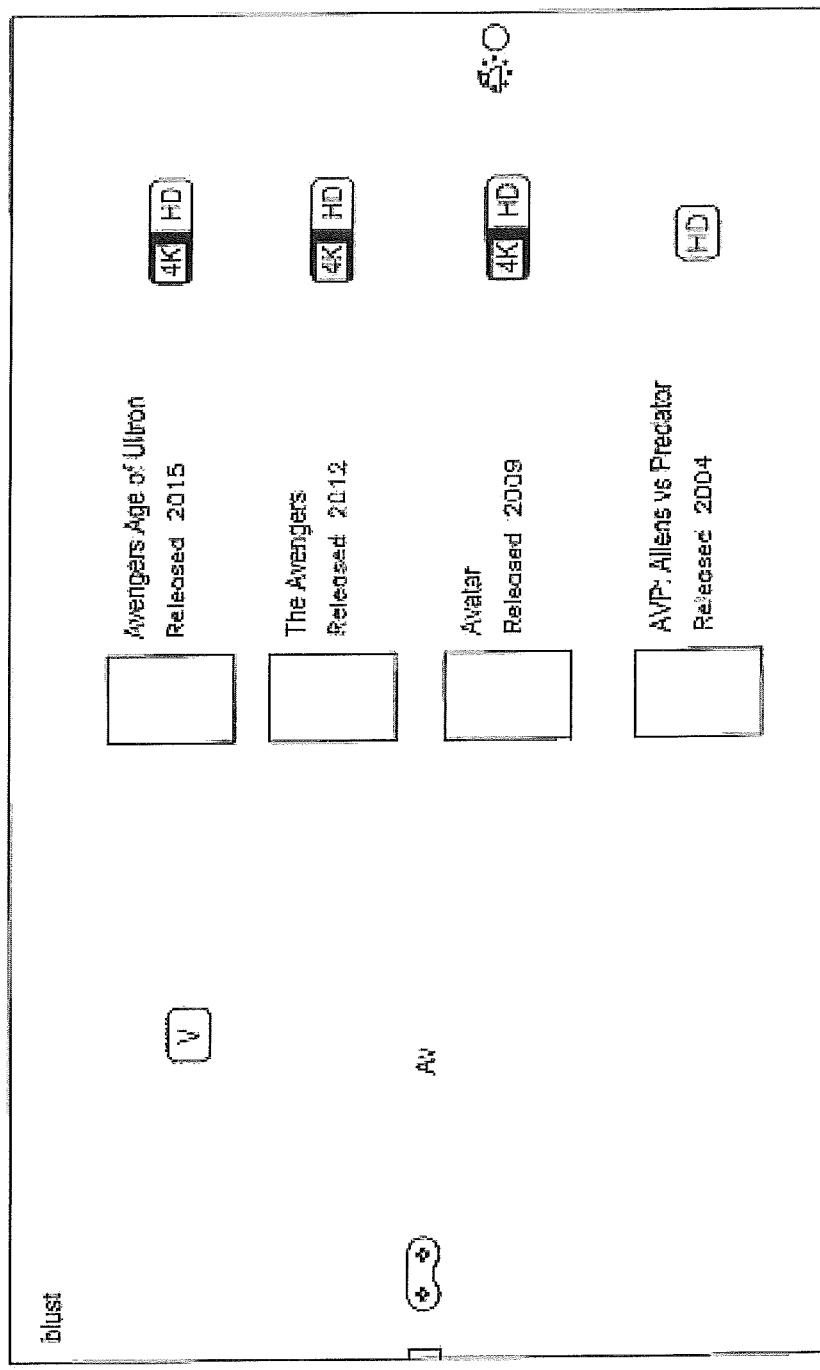
FIG. 17 is a screenshot of a selection screen interface for the embodiment of FIG. 12.

FIG. 17 is a screenshot of a selector screen arrangement.

In particular forms a user may make use of associative technology which clusters items for selection in accordance with predetermined criteria. An example of such a system is described in US 2014/0330841 the description, claims and drawings of which are incorporated here by cross-reference. In particular forms a correlation algorithm is applied between items belonging to a finite set of items wherein each item has an associated visual indicia and at least a set of attributes that are common to every other item belonging to said finite set of items to facilitate discovery of said items within said finite set.

In particular forms a scoring system is used to quantify the degree of correlation.

In a further preferred embodiment, Secure Peer Assist may be "inserted" in or integrated with Adaptive Bit Rate protocols in order to utilise the extensive existing assets and resources that use adaptive bit rate. This may be by direct integration or via an Application Programming Interface (API). Secure Peer Assist would be responsible for network communication and would interface to Adaptive Bit Rate resources such as media servers, video encoders and segmenters/packagers, Digital Rights Management systems, key management systems, content distribution networks, video players, browsers, client applications etc. Secure Peer Assist would manage timely delivery of video and other content packets. To the adaptive bit rate protocol it would appear as an optimum single fixed rate stream. In effect this would convert adaptive bit rate into progressive download or optimum fixed rate streaming, depending on available user bandwidth.

In a further preferred embodiment, Secure Peer Assist would be integrated with Dynamic Adaptive Streaming over HTTP (DASH), also known as MPEG-DASH, with Common Encryption and Encrypted Media Extensions (EME). A proposed name for this arrangement would be DSPASH (Dynamic Secure Peer Assist over HTTP). This preferred embodiment would be integrated with an HTML5 browser supporting Media Source Extensions. This would provide a standardised implementation, capable of the most efficient implementation across a multiplicity of consumer devices.

A further preferred embodiment would use Microsoft PlayReady DRM and the Microsoft Edge HTML5 browser on the above described preferred embodiment of an Intel processor hardware platform implementing PlayReady in hardware under the tightly integrated Microsoft Windows 10 (or later) operating system.

INDUSTRIAL APPLICABILITY

The network appliance may be implemented as standalone hardware units or multiple connected units programmed with the secure peer assist criteria described above. In alternative forms the secure peer assist criteria may be made available for programming into other devices such as smart phones, game controllers, smart TVs and the like.

Figure 1:
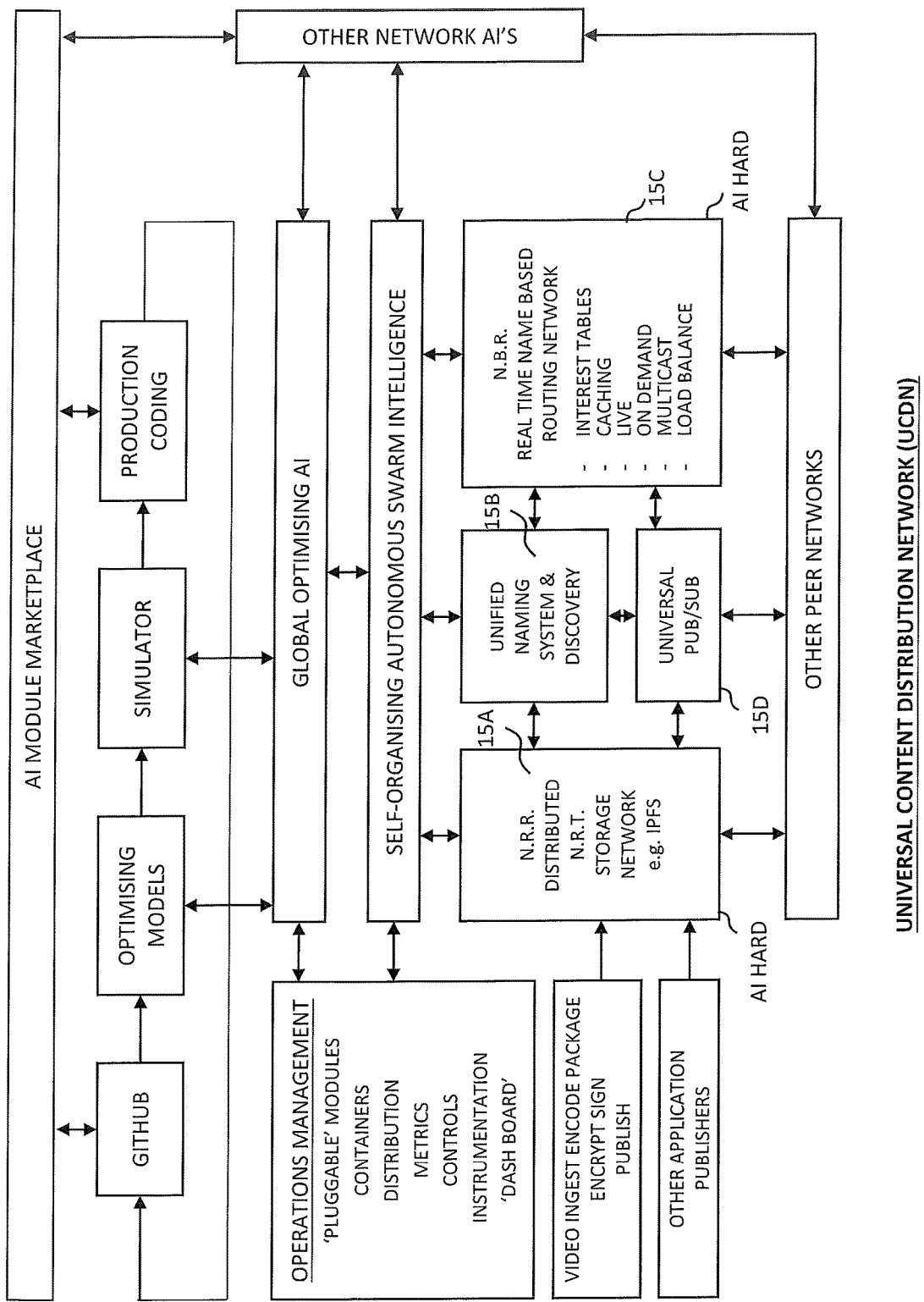
FIG. 1 is a block diagram of a system which combines and extends sub-systems to form a widely applicable, universally operable, highly scalable and efficient system for optimisation, management and operation of a Unified Content Delivery Network (UCDN) incorporating AI-driven Secure Peer-Assisted Networking (SPAN-AI), which is a hybrid adaptive networking technology that provides global, scalable, secure, distributed content storage, computation, and delivery for any application and network environment. SPAN-AI recognizes the limitations of existing technologies, only suitable for specific applications at non-global scale, and uses an AI-driven approach to improve and adaptively combine best-fit features of existing solutions under a unified secure content-addressable architecture. We call this a Unified Content Delivery Network or UCDN.
Figure 1A:
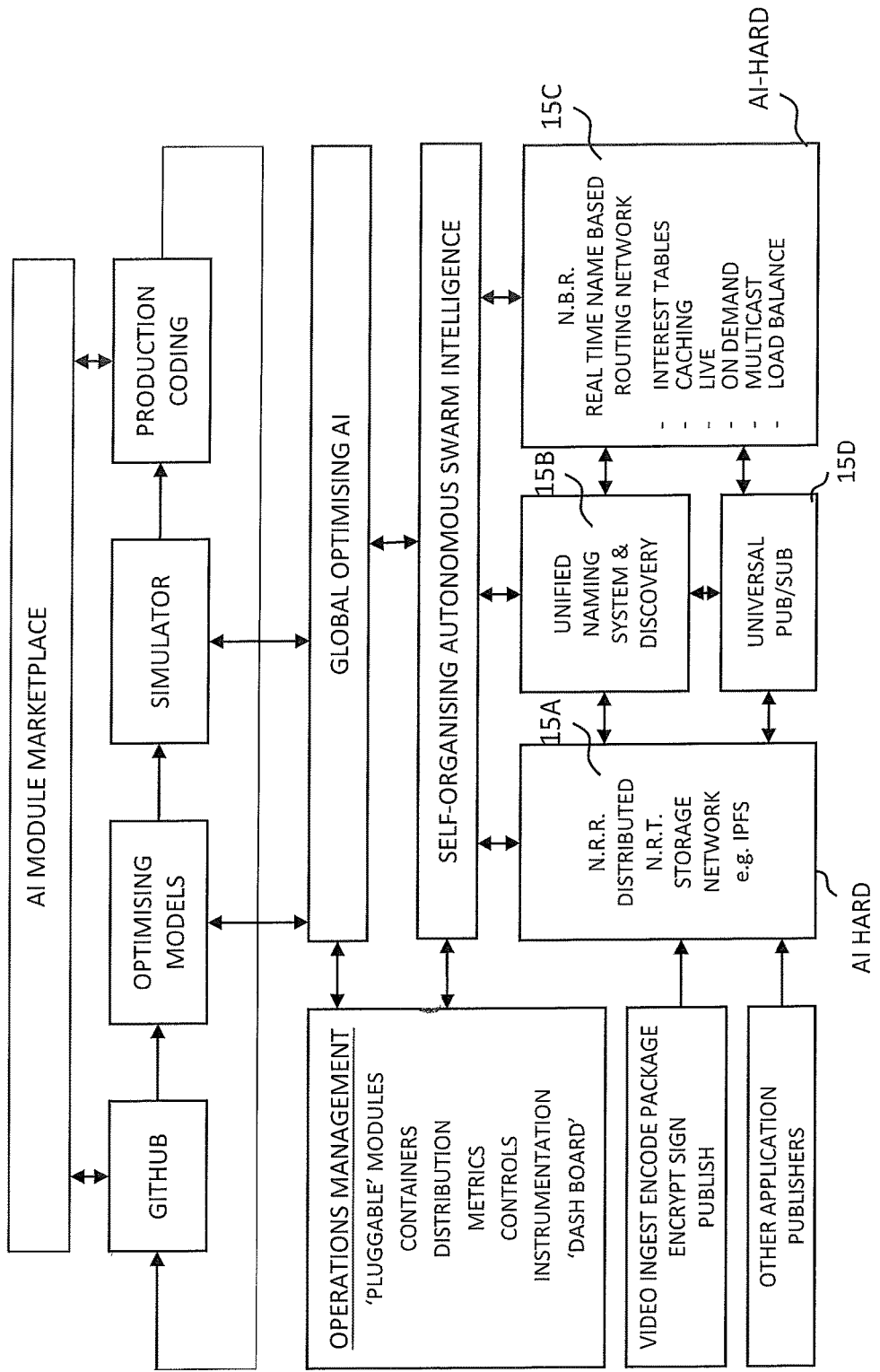
FIG. 1A is a system block diagram of the SPAN-AI system incorporating AI-HARD operable in the context of the UCDN system of FIG. 1.

Server based devices can be used to implement the aggregator 12 and the origin store 11.
Introduction to Span-AI Embodiment and UCDN Embodiment of a Media Distribution and Management System With reference to FIG. 1A there is shown a block diagram of a SPAN-AI embodiment of a media distribution and management system 10 as shown in FIG. 2A. The SPAN-AI embodiment includes sub-systems which form a widely applicable, universally operable, highly scalable and efficient system for optimisation, management and operation of a Unified Content Delivery Network (UCDN)—as shown in FIG. 1—incorporating AI-driven Secure Peer-Assisted Networking (SPAN-AI), which is a hybrid adaptive networking technology that provides global, scalable, secure, distributed content storage, computation, and delivery for any application and network environment. SPAN-AI recognizes the limitations of existing technologies, only suitable for specific applications at non-global scale, and uses an AI-driven hybrid routing approach to improve and adaptively combine best-fit features of existing solutions under a unified secure content-addressable architecture. We call this a Unified Content Delivery Network or UCDN.

UCDN creates a global network of inter-operable peer networks, thereby eliminating the problems associated to date with the "network of networks" approach. UCDN does that via open standards, interfaces, protocols, methods enabling any network to inter-operate with any other. These include but are not limited to AI and routing standards, interfaces, protocols, methods.
Background The initial embodiments with reference to FIG. 2A teach a hybrid ecosystem of peer to peer streaming and download, combining semi-centralized (cloud) media distribution and management servers and super-pops (points of presence) with distributed, [self-organising], intelligent edge nodes in a mesh network forming a [content based] distributed storage network for optimal distribution of encrypted media content via the Internet utilising [centralized and distributed] network knowledge to provide comprehensive quality of service (QoS) monitoring, control and optimisation of the entire network. That system is referred to above as Secure Peer Assist (SPA) and is now known and will be referred to as the Secure Peer Assist Network, or SPAN; incorporating AI it is known as SPAN-AI and incorporating Hybrid Adaptive Routing Design it is known as SPAN-AI-HARD.

The initial embodiments with reference to FIG. 2A further teach that routing information may be distributed and/or centralized and may be in the form of hash tables or other efficient database mechanisms. This detailed knowledge combined with control of network appliances 14 and routing is a form of software defined networking (SDN).

It further teaches that specifically "network knowledge" includes address information for all data packets that will form digital content 13 and, more particularly, at any one time address information for all data packets that form part of a specified item 17. This data packet address information may be stored in a database 40 as shown in FIG. 3 wherein each individual address, for example address AA of respective data packet 24 is linked to a location, location loci in this instance.

The database 40 may be stored on or form part of the origin store 11 or it may be a separate server. In other instances, it may be stored, at least partially, in memory 21 of the individual network appliances 14 in order to provide a distributed storage arrangement. It will be understood that over time there will become available a significant number of sources distributed over a wide area from which a specified item 17 may be downloaded (in whole or in part).

The Secure Peer Assist criteria and applications programs based on them are aware of and report network traffic at the SCTP, TCP/IP, UDP and video packet level. Each network appliance 14 forms an intelligent node in a mesh network. This may be sometimes described as grid computing or distributed cloud computing. We combine distributed and centralized routing information and intelligence down to the video packet level. This enables optimum management of the network with Software Defined Network like capability.

Secure peer assist criteria permit formation of an entire ecosystem for video and game delivery management via the Internet. Each network appliance 14 monitors metrics and statistics at the network and video packet level, reporting traffic and video state in real time. Combined with video asset management and distribution platform and Super PoP CDN, there is provided comprehensive quality of service (QoS) monitoring and control for the entire network. Secure Peer Assist criteria provides a very efficient method of video distribution via the Internet, minimizing network load and maximising network and customer viewing performance. Secure Peer Assist criteria may also be implemented in Consumer Electronics (CE) apps.

Secure Peer Assist criteria (SPAC) 19 extends network reach beyond the edge, right to customers' homes.

The initial embodiments with reference to FIG. 2A describes a system for management and optimisation of telecommunications networks. In preferred embodiments it is a system for management and optimisation of the Internet, telecommunications carriage networks and Content Delivery Networks (CDNs). The SPAN-AI embodiment and the UCDN embodiment build on the SPAN system—components of which are shown in FIG. 2A (in addition to the SPAN components). Ultimately, the additions comprising the SPAN-AI embodiment and the UCDN embodiment teach the methods of a Unified Content Delivery Network (UCDN), incorporating and extending the methods of the distributed storage network of the SPAN system thereby unifying and optimising all Internet, telecommunications carriage networks and Content Delivery Networks (CDNs) into a single, unified, optimised network. In preferred embodiments, this is done by state-of-the-art methods of Secure Peer Assist Network (SPAN) machine learning and Artificial Intelligence Hybrid Adaptive Network Design, or SPAN-AI-HARD.

There are other initiatives and projects that, combined with the SPAN system, define the current state of the art. These include the Named Data Network project [i], [ii]; Information Centric Networking [iii], [iv] and IPFS [v]. These other initiatives are not complete solutions. They effectively form sub-systems of a general, scalable solution that is the UCDN embodiment. Each on its own has limits, particularly limits of applicability and limits of growth. UCDN, incorporating SPAN-AI and AI HARD overcomes those limits.

Summary of SPAN-AI Embodiment and UCDN Embodiment

The present invention combines and extends these subsystems to form a widely applicable, universally operable, highly scalable and efficient system for optimisation, management and operation of a Unified Content Delivery Network (UCDN) incorporating AI-driven Secure Peer-Assisted Networking (SPAN-AI), which is a hybrid adaptive networking technology that provides global, scalable, secure, distributed content storage, computation, and delivery for any application and network environment. SPAN-AI recognizes the limitations of existing technologies, only suitable for specific applications at non-global scale, and uses an AI-driven approach to improve and adaptively combine best-fit features of existing solutions under a unified secure content-addressable architecture. We call this a Unified Content Delivery Network or UCDN.

UCDN creates a global network of inter-operable peer networks, thereby eliminating the problems associated to date with the "network of networks" approach. UCDN does that via open standards, interfaces, protocols, methods enabling any network to inter-operate with any other. These include but are not limited to AI and routing standards, interfaces, protocols, methods. UCDN creates a global network of inter-operable peer networks, thereby eliminating the problems associated to date with the "network of networks" approach. UCDN does that via open standards, interfaces, protocols, methods enabling any network to inter-operate with any other. These include but are not limited to AI and routing standards, interfaces, protocols, methods.

A UCDN is formed from a network of one or more inter-operable peer networks.

The UCDN network may comprise peer networks in the form of SPAN_AI networks.

Figure 1B:
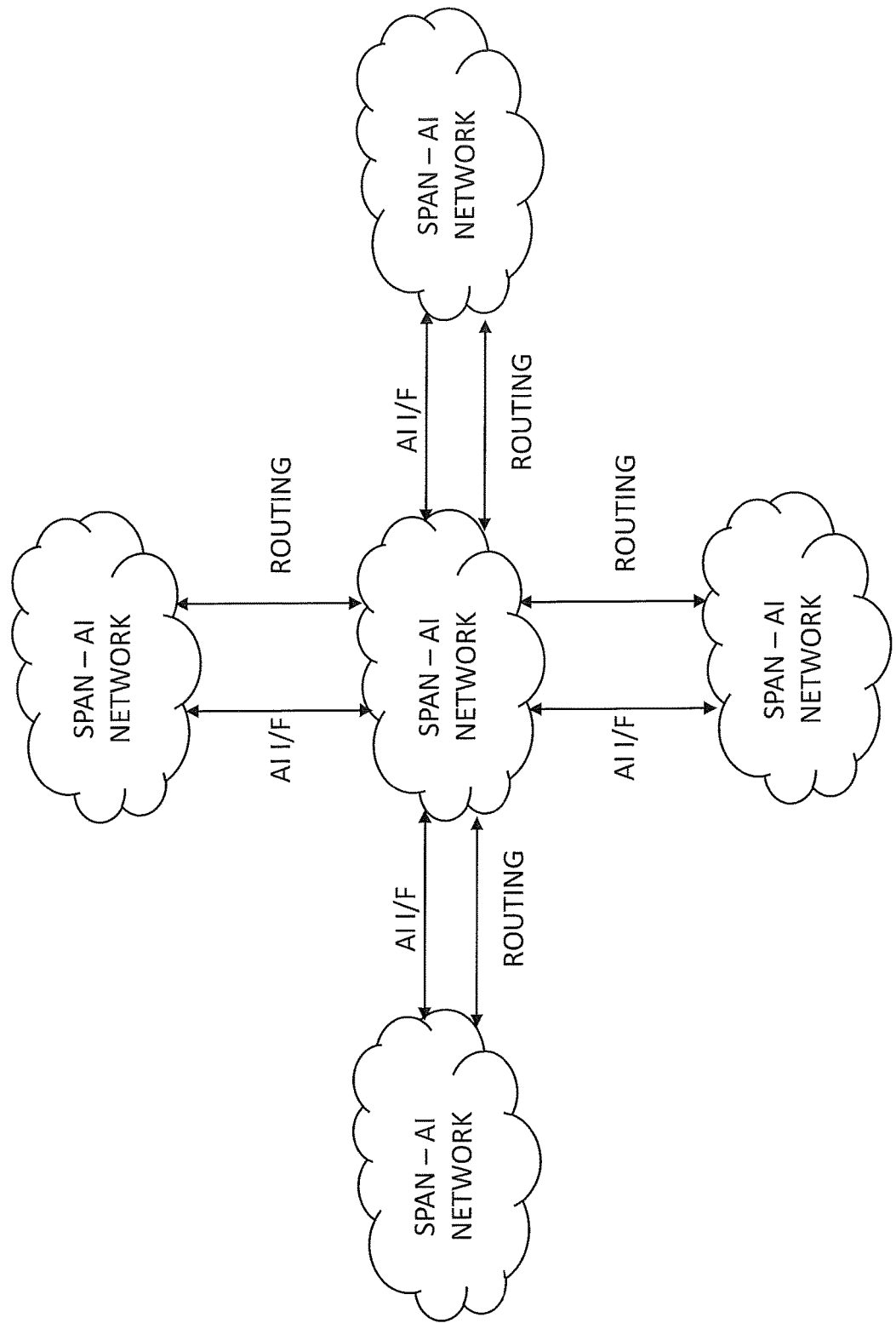
FIG. 1B is a block diagram of an embodiment of UCDN being a network of one or more SPAN-AI networks operating via AI, routing or other interfaces.

These are rendered inter-operable by the use of open standards, interfaces, protocols or methods. In a preferred embodiment this may be a network of one or more SPAN-AI networks inter-operating via AI, routing or other interfaces (see FIG. 1B).

Any network may be transformed into a SPAN-AI network simply by the "injection" (distribution of containerized micro services or applications) of SPAN-AI agents into the network and the incorporation of SPAN-AI intelligent hybrid adaptive routing (AI-HARD) and a SPAN-AI global optimising AI into the network.

Figure 1C:
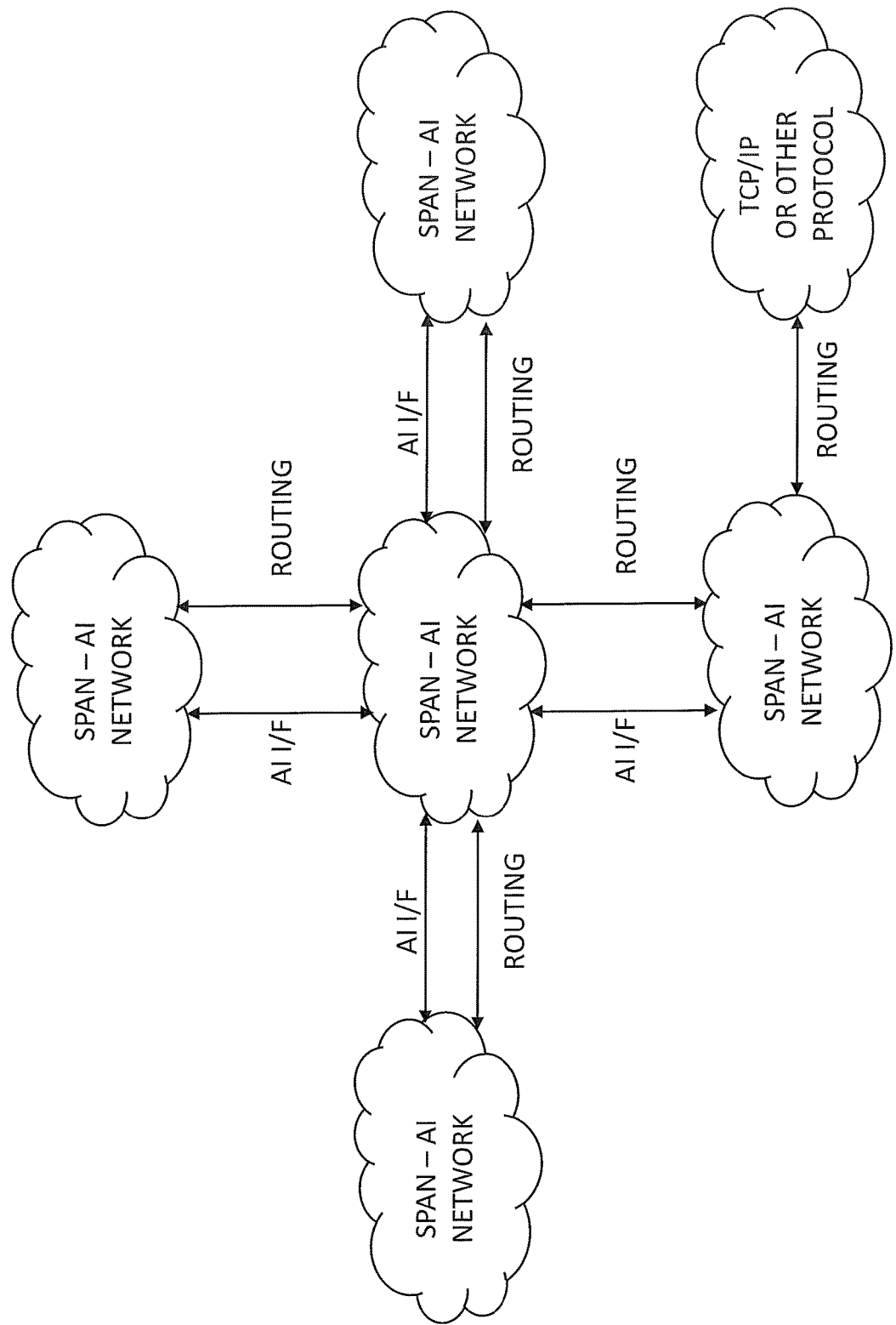
FIG. 1C is a further embodiment of UCDN incorporating legacy networks which may be TCP/IP or other protocol networks.

Alternatively, any network may be interconnected to form a UCDN by connection to compatible open standard interfaces, protocols or methods (APIs) of a SPAN-AI network to retain compatibility and communication with "legacy" networks (see FIG. 1C). Preferably these networks would be transformed into SPAN-AI networks.

A minimal embodiment of a SPAN-AI network comprises a network of self-organising peers and agents incorporating AI-HARD intelligent hybrid adaptive routing with a global optimising AI. Other embodiments may include any additional capability or function.

The core SPAN-AI systems are:

Routing

SPAN-AI's routing protocol, AI-HARD (Hybrid Adaptive Routing Design), is composed of 2 subsystems: Storage-centric routing subsystem; and Delivery-centric routing subsystem; combining the benefits of name-resolution-based routing (NRR) for scalable, available, accessible distributed storage, and the advantages of name-based routing (NBR) for fast, reliable content delivery. AI HARD also combines IP routing to provide backward compatibility.

AI-HARD intelligent agents within SPAN-AI exploit predictive knowledge about network conditions and application requirements to adaptively choose the most efficient routing policies from subsystems.

The publication of AI-HARD protocols enables incorporation in existing as well as new routers. This ensures routing compatibility between all networks.

Naming and Discovery

SPAN-AI's unified naming and discovery system (UND) i) maps mutable human-readable names (e.g., domain names, content names) to immutable self-certifying content identifiers (CIDs), and ii) enables routing CIDs through both NRR and NBR subsystems by iii) prepending a name prefix to each CID. UND also combines IP DNS to ensure backwards compatibility.

In another preferred embodiment SPAN-AI's unified naming and discovery system (UND) i) maps mutable human-readable names (e.g., domain names, content names) to immutable self-certifying content identifiers (CIDs), and ii) enables routing CIDs through both NRR and NBR subsystems by iii) combining a name prefix and CID in such a way as to optimise routing and/or storage. UND also combines IP DNS to ensure backwards compatibility.

UND discovery includes both SPAN-AI's smart discovery service AmI-Rendezvous and IP name discovery i.e. DNS.

Publishing of the UND naming standards and conventions enables inter-operation of existing IP networks with new SPAN-AI networks. The conventions include IP naming e.g. DNS.

Publish Subscribe (pub-sub)

SPAN-AI uses an AI-driven pub-sub system for asynchronous multi-party dissemination services. This includes communication between AI agents, naming services, and discovery services. This also includes inter-operation with IP discovery services.

Global Optimising AI

SPAN-AI provides optimisation at the global level by "rolling up" data from hierarchical AI agents with varying degrees of awareness and optimization capabilities at peer, edge, core and other network levels. This provides a global view and allows global optimisation. The data and protocols make use of a formal logic ontology and semantics to describe the SPAN-AI system.

Publishing of Open interfaces enables other networks' AIs to communicate with SPAN-AI and between themselves. These interfaces will make use of the SPAN-AI semantics and ontology. They may also make use of open Software Defined Networking (SDN) standards such as OpenFlow.

Self-Organising Swarm Intelligence

SPAN-AI orchestrates the adaptive operation of the routing and pub/sub systems via a family of pluggable, hierarchical (local/edge/global/other) AI agents that provide monitoring, prediction, optimization, and control services with varying degrees of awareness and optimization capabilities at peer, edge, core and other network levels.

These agents use distributed control and machine learning models to form self-organising swarms to optimise behaviour at a local and edge level, providing adaptability to and recovery from dynamic events such as mass churn, etc.

The swarm intelligence enables other swarms to join and be part of the network.

SPAN-AI, for AI-driven Secure Peer-Assisted Networking, is a hybrid adaptive networking technology aimed at providing global, scalable, secure, distributed content storage, computation, and delivery for any application and network environment.

SPAN-AI recognizes the limitations of existing technologies, only suitable for specific applications at non-global scale, and leverages an AI-driven approach and hybrid adaptive routing to improve and adaptively combine best-fit features of existing solutions under a unified secure content-addressable architecture. We call this a Unified Content Delivery Network or UCDN.

Glossary:

Peer: any hardware or software apparatus with a similar or comparable general or specific purpose in whole or part.

P2P: Peer-to-Peer.

Agent: a software application with varying degrees of awareness, communication, optimization, learning, reporting, self-organising or other capabilities distributed to and/or running on any network appliance (computer, consumer electronics device, router, switch, server, etc) at peer, edge, core, or other network levels; a virtual network service or application. This could be an AI agent; an application running on a virtual peer ie an operating system running in a virtual environment; a network service; etc.

I/F: interface. A method of inter-connecting software or hardware applications to each other or to people for the purpose of communication. In a preferred embodiment the method is open and standardised in which case the interface may be known as an Application Programming Interface or API.

Peer Network: any network with a similar or comparable general or specific purpose in whole or part.

IP: Internet Protocol; the "thin waist" routing protocol of the original and current Internet TCP: Transport Control Protocol SPAN: Secure Peer-Assisted Networking AI: Artificial Intelligence ML: Machine Learning AmI: Ambient Intelligent HARD: Hybrid Adaptive Routing Design SAMSim: Self-Aware Mesh Simulator CID: Content Identifier IPFS: Inter-Planetary File System IPLD: Inter-Planetary Linked Data IPNS: Inter-Planetary Name System DNS: Domain Name System DNSLink: protocol that uses DNS text records to link domain names to IPFS addresses or CIDs NDNS: Domain Name System for Named Data Networking mDNS: multicast DNS Pub/Sub: Publish/Subscribe libp2p: a location independent modular network stack. Part of IPFS.

NRR: Name Resolution based Routing

NBR: Name Based Routing

NDN: Named Data Networking

NBN either Name Based Networking or National Broadband Network in Australia

DHT: Distributed Hash Table

DRM: Digital Rights Management

VoD: Video on Demand

ISP: Internet Service Provider

CDN: Content Distribution Network

PoP: Point of Presence

FIL: Filecoin crypto token trading abbreviation testlab & testground: IPFS test frameworks PoC: Proof of Concept MVP: Minimum Viable Product NRT: Near Real Time or Non-Real Time ISO: International Standards Organisation QoS: Quality of Service telecomm's: telecommunications telco: telecommunications company Node: a vertex of a graph network model; the joining point of graph edges;

Edge: network edge (1-2 hops away from the end-user device); or the connection between nodes in a graph;

Graph: mathematical model used to represent communication networks, data organization, computational devices, the flow of computation or communication, etc.

UND: Unified Naming and Discovery/Directory system/service

Introduction

SPAN-AI, for AI-driven Secure Peer-Assisted Networking, is a hybrid adaptive networking technology that provides global, scalable, secure, distributed content storage, computation, and delivery for any application and network environment.

SPAN-AI recognizes the limitations of existing technologies, which are only suitable for specific applications at non-global scale. SPAN-AI uses an AI-driven approach to improve and adaptively combine best-fit features of existing solutions under a unified secure content-addressable architecture. We call this a Unified Content Delivery Network or UCDN.

SPAN-AI is based on 5 key systems: unified naming; unified discovery; hybrid routing; scalable pubsub; and embedded security; all securely integrated and jointly optimized via a hierarchical, pluggable AI framework with an associated simulation, training, and development pipeline that embeds AI agents with varying degrees of awareness and optimization capabilities at peer, edge, core and other network levels.

SPAN-AI Architecture

SPAN-AI uses a Unified Naming and Discovery System that i) maps mutable human readable names (e.g., domain names, content names) to immutable self-certifying content identifiers (CIDs), and ii) enables routing CIDs through both name-resolution and name based routing subsystems by iii)

prepending a name prefix to each CID or iv) combining a name with a CID in such a way as to optimise routing and/or storage.
1. Unified Naming System
   a. SPAN-AI is content-addressable
   b. Content items or blocks are identified via immutable self-certifying content identifiers (CIDs), as in IPFS
   c. A global, distributed naming directory service is used to map mutable human-readable names/links to immutable CIDs
      i. Initially, IPNS and/or DNSLink will be used
      ii. Extensions include the use of NDNS
   d. CIDs are then resolved (CID-provider mapping and provider-requester path formation) via a hybrid adaptive routing system (system 3)
      i. Name-resolution based routing, i.e., querying a (multi-level) DHT
      ii. Name based routing, i.e., hop-by-hop forwarding of an interest packet with a prefix (e.g., SPAN/<CID>)
   e. Extensions include hierarchical names and name-based routing for name-CID mapping
   f. SPAN-AI intelligence determines where to host distributed naming services (see SPAN-AI Intelligence section)
   g. SPAN-AI pub/sub system is used for scalable, fast dissemination of naming updates (see Scalable Pub/Sub system)

The Unified Naming System may also use JSON updates in a Conflict-free Replicated Data Type (CRDT) with cryptographic key value pairs. These may be structured in DHTs, Merkle Trees, simple blockchains or other efficient distributed data structures.

SPAN-AI employs an AI-driven unified discovery system, whose key component, Ambient Intelligent Rendezvous (AmI-Rendezvous), provides smart discovery, configuration, and self-organization services.

2. Unified Discovery System (AmI-Rendezvous)
   a. Provides smart discovery, configuration, and self-healing services
      i. Bootstrap nodes, discover peers, maintain DHTs and pub/sub overlays
   b. Combines peer-level self-healing intelligence and edge-level smart discovery (see AmI-Rendezvous operation in SPAN-AI intelligence section)
   c. SPAN-AI intelligence determines where to host distributed AmI-Rendezvous services (see SPAN-AI intelligence section)
      i. AmI-Rendezvous is ideally co-hosted with edge-level naming and intelligence services
      ii. Peers register on initialisation after performing mDNS and DHT discovery.
      iii. Data partitioning and service placement may be guided by naming.

SPAN-AI addresses routing at scale via an AI-driven Hybrid Adaptive Routing Design (AI-HARD), composed of 2 subsystems, aimed at combining the benefits of name-resolution-based routing (NRR) for scalable, available, accessible distributed storage, and the advantages of name-based routing (NBR) for fast, reliable content delivery. AI-HARD includes storage and delivery markets.

3. AI-Driven Hybrid Adaptive Routing Design (AI-HARD)
3.1 Storage-Centric Routing Subsystem
   a. Main goal is persistent data availability (all content should be reachable) and relatively fast content access (<1 sec)
   b. Name-resolution-based routing (NRR) via new parametrized multi-level DHT incorporating
      i. Learned information about user demands (e.g., content popularity, delivery deadlines) and network/topological structure (e.g., hop-distance, latency, load) used to create multiple, limited-size, fast-lookup layers
      ii. Topological layers
         1) Each DHT only involves topologically nearby nodes
         2) Local, regional, national DHTs
      iii. Topic layers
         1) Each DHT only involves content related to a given topic
      iv. Heterogeneous layers
         1) Each DHT involves nodes that are both nearby and share similar interests
   c. Intelligent content placement with adaptive replication level
      i. Content is replicated according to learned interest/popularity and network connectivity/stability (more replication under high churn/instability)
      ii. Replication level is optimized to guarantee lookup+delivery latency requirements of "storage-centric" applications. Additional in-network caching is provided for delivery-centric applications (see subsystem 3.2)
   d. Multi-level DHT structure and associated parameters (layers, participant nodes, bucket size, concurrency factor), as well as content replication, are dynamically adjusted based on AI-driven optimization and distributed control algorithms (see AI-HARD operation in SPAN-AI Intelligence)
   e. Multi-level DHT and smart content replication solutions allow maximizing the number of queries resolved locally in order to provide efficient, scalable, persistent content access
   f. Content-level (as opposed to chunk-level) forwarding state to further improve scalability
   g. Integrated with name-resolution-based subsystem via common unified name directory service (system 1)

3.2 Delivery-Centric Routing Subsystem
   a. Main goal is fast content delivery (<100 ms)
   b. Name-based routing (NBR) for fast lookup and delivery (e.g., NDN)
      i. Dataplane-aware symmetric Interest-Data packet forwarding
      ii. In-network caching
      iii. Native multicast and mobility support
      iv. In-network load balancing
   c. Integrated with NRR subsystem via common unified name directory service (system 1)
   d. Only used for applications with real-time requirements (e.g., video streaming)
      i. Reserved to applications that can benefit from faster and more efficient application level aware (as opposed to network level) content distribution
      ii. Significantly reduces forwarding state (NRR subsystem handles apps with non real-time requirements)
      iii. Allows keeping chunk-level forwarding state to exploit path diversity and further speed-up content delivery.

3.3 Market Enablement
   a. Storage-centric
      i. Publishers may choose and pay for suitable storage metrics (reliability, duplication, dispersion, persistence, etc.) in a market such as Filecoin ii. SPAN-AI supports multiple storage markets and technology platforms and unites them into a Unified Content Storage and Delivery Network. This may include storage markets and platforms such as blockchain.
b. Delivery-centric
   i. Publishers may choose and pay for suitable delivery metrics (resolution, bit rate, delay, etc.) in a market similar to Filecoin
   ii. Distribution providers (telco's, ISPs, CDNs, etc) may bid for delivery in the same market or rely on SPAN-AI and AI-HARD to choose the most efficient path, thereby incentivizing efficiency
   iii. Consumers may choose which distributor or distributors they wish to use if, for example, they have come to an arrangement with any distributor. Consumers are free to choose if and who they make arrangements with, or they may contribute to and be rewarded by a common pool or pools.
   iv. Distribution preferences may be expressed by consumers in the name request. For example: SPAN://warnerbros/batman/directorscut/4K/<myaddress>/telstra/akamai/(actual names and order may vary due to naming and routing considerations)
   v. Publishers may choose default delivery partners. In the event of a conflict, SPAN-AI and AI-HARD will choose the most efficient path, once again incentivizing efficiency.
   vi. If the consumer or publisher does not specify distribution preferences, SPAN-AI and AI-HARD choose the most efficient path.
   vii. If a consumer's or publisher's chosen distributor or distributors is/are not the most efficient in any routing case, SPAN-AI and AI-HARD will choose the most efficient path and inform all interested parties of the decision to allow them to optimize efficiency.
   viii. Payment for distribution is calculated and made by a settlement system or systems, informed by the SPAN-AI and AI-HARD routing system, in a similar manner to how telephony call settlement is performed today.
   ix. Anyone may contribute resources and be rewarded for that contribution, providing a free market for telecomm's services. SPAN-AI monitors and maintains the security and health of the network. Non-performing resources will be removed. SPAN-AI is designed to work and meet QoS levels on both commercial and telco grade resources. QoS metrics and cost will determine the resources used and vice versa.

SPAN-AI uses an AI-driven pub-sub system for asynchronous multi-party dissemination services that support control plane dissemination: directory updates (names, discovery, configuration) and intelligence updates (optimization/control operations); as well as data plane dissemination: collaborative applications, live streaming, etc.

4. Scalable Pub/Sub System
   a. Fast, scalable, asynchronous, multi-party dissemination services
   b. Pubsub for control
      i. Name directory updates
      ii. Discovery updates (new peers, new services)
      iii. Configuration updates (new roles, new memberships)
      iv. Intelligence updates (optimization/control commands, e.g., resource allocation, storage, and routing decisions)
   c. Pubsub for data
      i. Collaborative media apps
      ii. Live streaming
   d. The pub/sub system uses an evolution of existing pubsub algorithms such as Gossipsub, PlumTree, HyParView that uses the
AmI-Rendezvous Service for Improved Operation
   i. AmI-Rendezvous smart discovery and self-healing improves scalability and churn-resilience with little impact on routing scheme, other than tuning overlay degree, fanout, and probability weights.
   ii. Embedded plugins for self-healing and smart discovery strengthen peer discovery, activation, and lifecycle maintenance of overlay:
      1) The pub/sub system is embedded with pluggable metrics, actuators, and triage for smart discovery
      2) A periodic heartbeat disseminates mesh-health metrics to AmI-Rendezvous SPAN-AI incorporates security integrated at all levels. SPAN-AI uses machine learning and recognition to detect and manage security threats. Content can be encrypted using commercial DRM systems such as PlayReady before it is published to the system. Data packets can be cryptographically signed by the publisher. Naming is rooted in self-sovereign identity, which can be defined as a lifetime portable digital identity that does not depend on any centralized authority. It uses decentralized identifiers that provide: persistence, global resolvability, cryptographic verifiability, and decentralization. Names can also be self certifying. A preferred embodiment is based on a hardware root of trust and secure boot. A further preferred embodiment may make use of Web of Trust methods. Quantum encryption, i.e. encryption based on quantum state random number generators, may also be used.

5. Overarching Security Architecture and Preferred Embodiments
   a. Machine learning and recognition to detect and manage security threats
   b. Cryptographic packet signing
   c. Encryption and DRM
   d. Hardware root of trust
   e. Secure boot
   f. Decentralized identifiers. This may make use of Web of Trust methods.
   g. Sovereign identity
   h. Naming rooted in sovereign identity
   i. Self-certifying names using CIDs with a prefix.
   j. Quantum encryption

SPAN-AI

SPAN-AI orchestrates the adaptive operation of the routing and pub/sub systems via a family of pluggable, hierarchical (local/edge/global/other) AI agents that provide monitoring, prediction, optimization, and control services with varying degrees of awareness and optimization capabilities at peer, edge, core and other network levels.

SPAN-AI uses a simulation, training, and development pipeline that enables cloud-level replication of runtime environments, simulation, testing, and training of AI models, that can then be plugged into peer/edge/core/other network nodes for real-time optimization and control.

SPAN-AI provides a marketplace for pluggable AI agents to enable open, flexible innovation in the optimization and control of universal networks. This may be based on a crypto token such as Filecoin or Blust.

1. Hierarchical AI
   a. Hybrid local/global optimization and control
      i. Combine fast local reactive self-organization with slower global/hierarchical proactive guidance/supervision and backup support
   b. Hierarchical intelligence
      i. Local intelligence at peer level
         1) Local monitoring and fast reactions for basic survivable operation and self-organization
         2) Fast and simple rules (e.g., filters, thresholds)
         3) Limited capability nodes
      ii. Ambient/swarm intelligence at edge level
         1) Higher level services supporting discovery, bootstrap, configuration, resource allocation, role assignment, storage decisions, routing hints, pub/sub memberships, naming
         2) Ideal place for ML models
         3) Nodes with higher capabilities, trust, and stability
      iii. Global intelligence at core level
         1) Optimization with global view
         2) Training of ML models to be pushed down to the edge
         3) AI Simulation
         4) Highest capability nodes (e.g., stable peers, cloud nodes, ISP core, CDN PoP)
   c. Application and network awareness
      i. Global predictive knowledge of users' consumption/production patterns, application requirements, network conditions (including overlay mesh health), and available resources for proactive optimization
      ii. Complemented by local situational awareness (of peer/mesh/network conditions) for reactive control and resilience to unpredictable change
      iii. Exploit metadata in content requests (e.g., delivery deadlines)
   d. Objectives & Principles
      i. No single point of failure in runtime agents/services (e.g., AmI-Rendezvous)
      ii. Metrics/actuator ontology for data-driven innovation in reinforcement learning
      iii. Open framework with pluggable programming APIs
      iv. AI agents reuse and market enablement
      v. Enable reuse of AI agents/components by innovative developers.
      vi. Inter-operable with existing telco, ISP, CDN, and Internet networks. This may use existing standards such as OpenFlow or new AI interoperability standards evolved from the SPAN-AI ontologies
      vii. Thus forming an inter-operable mesh of intelligent networks, operating as a single Unified Content Distribution Network, with no single point of failure.
2. AI-HARD Operation (Intelligent Hybrid Adaptive Routing)
   a. AI-HARD allows adaptively operating networks as full p2p overlays, full network-level meshes, or anything in between.
   b. Optimized role assignment and resource allocation
      i. Heterogeneous agents/roles
         1) Algorithms determine
            a) Service roles: DHT routing, name-based routing, storage, caching, discovery, monitoring, information mediation/decisioning
            b) Intelligence capability: reactive/proactive, local/global view, learning/observing, heuristic/optimization
         2) Based on
            a) Network architecture level: peers, gateways, servers, switches, routers, application servers, etc.
            b) Trust, security, and stability level
      ii. Resource allocation
         1) Algorithms determine
            a) Allocation of CPU, memory, disk, upload/download bandwidth resources to each subsystem within each agent
         2) Based on
            a) Service role
            b) Intelligence capability
            c) Network architecture level
            d) Trust, security, and stability level
         3) More stable, endpoint nodes will tend to have more resources allocated to storage-centric subsystem
         4) Less stable, in-network nodes will tend to have more resources allocated to delivery-centric subsystem
         5) Replication level in DHT is relaxed because name-based routing kicks in for delivery-centric applications
         6) Name-based routing forwarding state is relaxed because DHT handles content with looser delivery requirements
      iii. Incentivize resource contribution via FIL-type marketplace (see market enablement section)
      iv. Mostly provided by ambient and global intelligence nodes with edge/core level view/capabilities
      v. Complemented by self role assignment and resource allocation capabilities
   c. Optimized long-term placement and short-term caching
      i. Distributed cloud-network flow algorithms for long-term placement in distributed storage-centric subsystem
      ii. Probabilistic local caching policies for delivery-centric subsystem
   d. Adaptive name resolution vs name based routing
      i. AI-based optimization and self-organizing methods determine how applications split requests into the two subsystems
         1) Requests with loose delivery deadlines and predicted or pre-established requests with tight delivery deadlines can be handled by "slower", but persistent and scalable, DHT subsystem
         2) Requests with tight delivery deadlines are handled via fast name-based routing subsystem
         3) Incentivize pre-planned requests via FIL-like marketplace (e.g., for big releases—see market enablement section)
      ii. DHT routing operation
         1) Kademlia-type protocol but on improved multi-level DHT
         2) Adaptive DHT parameter optimization (nodes, blocks, replication factor, concurrency factor)
         3) AmI-Rendezvous for DHT maintenance and self-organization under high churn (see AmI-Rendezvous operation)
      iii. Name based routing operation
         1) NDN-type methods but with reduced forwarding state due to DHT subsystem cooperation 3. AmI-Rendezvous Operation (Intelligent Discovery and Configuration)
   a. Ambient Intelligence (AmI) refers to a combination of awareness and control for:
      i. Peer/Local Intelligence: Embedded actuators in pub/sub peers control probability weights, degree, and fanout of mesh. Observers of p2p pub/sub messaging compile metrics from neighbour subscriptions and events to infer health (e.g., hop-count, reliability, latency, load-balance). Self-healing strategies can be as simple as filtering.
      ii. Edge/Swarm Intelligence: AmI health classification decisions (scoring, ranking) for peers and p2p overlay meshes are derived by a basic reinforcement learning model.
      iii. Core/Global Intelligence: Maintain aggregated usage predictions and mesh/network conditions. Determine placement of rendezvous servers.
   b. AmI-Rendezvous service builds on state-of-the-art rendezvous services such as libp2p Rendezvous, which supports periodic peer re-registration, discovery, bootstrap, expanded with peer heartbeat and mesh health metrics and rankings.
   c. A pluggable interface for self-healing agents embeds AmI-Rendezvous clients into pub/sub
      i. Embeds pluggable metrics, actuators, and triage for smart discovery
      ii. A periodic heartbeat disseminates mesh-health metrics and change deltas to AmI-Rendezvous and SPAN-AI data lake.
      iii. Registration and re-registration is extended to exchange whole mesh snapshots
   d. A pluggable interface integrates smart discovery at rendezvous points
      i. AmI-Rendezvous server and messaging builds on libp2p Rendezvous service, with metrics collection expanded with time series based monitoring systems such as Prometheus, InfluxDB.
      ii. Integrates reinforcement learning agents for mesh health classification.
      iii. Discovery is extended with peer rankings.
   e. Additional features include discovery records, federation and caching, adaptive control, metrics/actuator reuse, topic specific/device specific metrics.
   f. Further embedded intelligence and adaptive control of simulations and development pipeline by integrating with AI-HARD solution to support:
      i. hybrid P2P routing via rendezvous bypass to satisfy deadlines or optimise overlay breadth,
      ii. rendezvous & information mediator role assignment/placement,
      iii. partitioning by DHT topological layers, hints from naming enhancements or global awareness,
      iv. coarse grained adaptive control activating plugins from families of plugins, smart discovery/healing for DHT and NDN routing.
   g. Support different mesh types (NBR, DHT-Kademlia) and assurance requirements metrics (security, trust, integrity, efficiency, reliability, stability, latency).

SPAN-AI Simulator

SPAN-AI uses a simulation, training, and development pipeline that enables cloud-level replication of runtime environments, simulation, testing, and training of AI models and agents, that can then be plugged into peer/edge/core/other network nodes for real-time optimization and control. SPAN-AI's simulator, Self-Aware Mesh Simulator (SAMSim), is supported by:
   distributed cloud hosting a big data lake of meshes with health metrics
   simulating and deploying AI models across an automated software engineering pipeline 1. Simulator Intelligence
   a. Test harness uses SPAN-AI intelligence for adaptive scalability, including guiding placement of AmI-Rendezvous servers, scheduling and supporting data exchange between federated rendezvous servers and data lake.
   b. Test frameworks are used to prototype SAMSim, especially agile container infrastructure (e.g. HashiCorp Nomad and Consul for orchestration, Prometheus and InfluxDB for metrics).
   c. AI developers use mesh-health metrics to test, train, sample simulations and reward reinforcement learning.
      i. Mesh health metrics and actuators frame a reinforcement learning problem.
      ii. Metrics and actuators are refined with rules elicitation and management in data lake.
      iii. Agents are refined from rules sets, metrics, and actuators, into:
         1) mock control and protocol plugins for abstract simulators (e.g. PeerSim, agent-based simulation, TestGround Topology Simulator, existing Gerbil simulator)
         2) prototype plugins for concrete embedded simulations (borrowing from D-P2P-Sim, RealPeer, ProtoSim) that are distributed across cloud providers like Amazon Web Services (AWS) or Digital Ocean Cloud (DO-Cloud).
      iv. Data engineering tools are integrated to prepare and quality control datasets.
   d. Simulator & pipeline features:
      i. Mostly derived from integrating test frameworks and integrated P2P simulators
      ii. Include multithreading, execution controls/runners, realistic stubs and network models, agile container infrastructure, metrics, and visualisation.
   e. Additional simulators include NS3 for network events, RealPeer and ProtoSim for refinement model, PlanetSim for intelligent swarming, PEERFACTSIM.kom for DHT routing.
   f. Additional simulator & pipeline features include customisable API standards, simulator layering, topology graph export formats and failure simulation.

2. Pub/Sub Simulation
   a. Supports essential scaffolding to engineer various trial agents by evaluating and integrating capabilities from the test framework and third party p2p simulators (e.g. PeerSim, D-P2P-Sim).
   b. The agent engineering and assurance environment:
      i. Initially focuses on ensuring latency in scalable, resilient pubsub meshes.
      ii. Supports simulation and iterative development of
         1) health metric compilation, triage for smart discovery on broadcast and gossip, triggering of actuators to filter or limit or weight probability of mesh overlays.
         2) messaging for AmI-Rendezvous registration, heartbeat, smart discovery
         3) messaging for pub/sub bootstrap, subscription/publication, grafts/purges
      iii. Supports reuse of mesh health data sets and health metrics and healing actuator rules across empirical simulation experiments. Reuse may be extended in future embodiments.

In Use
SPAN-AI Preferred Embodiments, and Use Case

In a particular embodiment the SPAN-AI embodiment may include a Distributed Origin Store, Publishing and Distribution System using SPAN-AI wherein the Distributed video origin store and distribution service comprise the steps of:

1. Ingest video: encode; package; encrypt; sign
2. Assign unified names
3. Publish to distributed storage network (NRR and DHT) with storage metrics
4. Publish in universal pub/sub system with distribution QoS metrics.

This use embodiment allows a user to subscribe to a video using universal pub/sub system.

It also allows a publisher to distribute video using NBR network for real time (live) streaming and/or NRR network for near/non real time distribution.

SPAN-AI for Gaming

It will be understood that, while a preferred embodiment of SPAN-AI is for the distribution of video, that SPAN-AI has been designed to be a Unified Content Distribution Network (UCDN) for ANY type of content. This includes, but is not limited to: game streaming (distributed or from a "server" or from a consumer's device); distributed game execution; social media; websites; blogs; ecommerce; medical applications eg MRI, Xray, remote diagnostics, etc; simulation; command and control; etc.

[i] http://citeseerx.ist.psu.edu/viewdoc/download?doi=10.1.1.366.6736&rep=rep1&type=pdf
[ii] https://named-data.net/
[iii] https://wiki.fd.io/view/Clcn
[iv] https://trac.letf.org/trac/irtf/wiki/icnrg
[v] https://ipfs.io/

The invention claimed is:

1. A Unified Content Delivery Network (UCDN) system which is formed from a network of one or more interoperable peer networks and wherein the peer networks include SPAN-AI network protocol and operating system networks; other Universal Content Distribution Network networks; and legacy IP networks; the SPAN-AI system comprising a hierarchical, hybrid adaptive AI driven network protocol and operating system technology that uses AI-driven hybrid adaptive routing comprising five key SPAN-AI sub systems: unified naming; unified discovery; AI driven hybrid adaptive routing (AI-HARD)system; scalable pubsub; and embedded security; all of said five key SPAN-AI sub systems securely integrated and jointly optimized via a hierarchical, pluggable AI framework, with an associated simulation, training, and development pipeline that embeds AI agents at peer, edge, core or other network level hierarchies; the UCDN system using a Unified Naming and Discovery (UND) System that i) maps mutable human readable names (including but not limited to, domain names, content names) to immutable self-certifying content identifiers (CIDs), and ii) enables routing CIDs through both name-resolution and name based routing subsystems, by either 1) prepending a name prefix to each CID; or by 2) combining a name and a CID in order to enable optimization of routing and/or storage by the SPAN-AI system and AI-HARD algorithms at the network level; and wherein AI-HARD intelligent agents within the SPAN-AI networks exploit current and predictive knowledge about network conditions and application requirements to adaptively choose most efficient routing and caching.

2. The UCDN system of claim 1 further employing an AmI-Rendezvous system which comprises an AI-driven universal discovery system which provides smart discovery, configuration, and self-organization services.

3. The UCDN system of claim 1; including said SPAN-AI system addressing routing at scale via said AI-driven Hybrid Adaptive Routing (AI-HARD) system; said AI-HARD system composed of two subsystems: a storage-centric routing sub system using name-resolution-based routing (NRR) for scalable, available, accessible distributed storage; and a delivery-centric routing subsystem using name-based routing (NBR) for fast, reliable content delivery.

4. The UCDN system of claim 1; said SPAN-AI system utilizing an AI-driven pub-sub system for asynchronous multi-party dissemination services that support: control plane dissemination of directory updates (names, discovery, configuration) and intelligence updates (optimization/control operations); as well as data plane dissemination for collaborative applications, including but not limited to social networks, video conferencing, and other collaborative applications.

5. The UCDN system of claim 1; where said SPAN-AI system uses an AI-driven pub-sub system for asynchronous multi-party dissemination services that include communication between AI agents, naming services, discovery services.

6. The UCDN system of claim 2 wherein the pub/sub system uses the AmI-Rendezvous system expanded with peer heartbeat and mesh health metrics and rankings for improved operation, intelligent discovery and configuration via a combination of awareness and control for: Peer/Local Intelligence; Edge/Swarm Intelligence; and Core/Global Intelligence.

7. The UCDN system of claim 2 wherein said AmI-Rendezvous system incorporates a pluggable interface for self-healing agents embedding AmI-Rendezvous clients into the pub/sub protocol.

8. The UCDN system of claim 1; said system orchestrating the adaptive operation of the routing and pub/sub systems via a family of pluggable, hierarchical (local/edge/global/other) AI agents that provide monitoring, prediction, optimization, and control services at peer, edge, core and other network levels.

* * * * *

UNITED STATES PATENT AND TRADEMARK OFFICE
CERTIFICATE OF CORRECTION

| | | |
|---|---|---|
| PATENT NO. | : 12,041,297 B2 | Page 1 of 1 |
| APPLICATION NO. | : 17/603673 | |
| DATED | : July 16, 2024 | |
| INVENTOR(S) | : Keith Rhett Sampson et al. | |

It is certified that error appears in the above-identified patent and that said Letters Patent is hereby corrected as shown below:

On the Title Page

Foreign Application Priority Data (30):
Change "Nov. 4, 2014 (AU) ..................... 2014904438
        May 9, 2020 (AU) ........................202091494"
To "Nov. 4, 2014 (AU) ..................... 2014904438
       May 9, 2020 (AU).................... 2020901494"

Signed and Sealed this
Twenty-fifth Day of February, 2025

Coke Morgan Stewart
*Acting Director of the United States Patent and Trademark Office*